US011416186B2

(12) United States Patent
Ueshima

(10) Patent No.: US 11,416,186 B2
(45) Date of Patent: Aug. 16, 2022

(54) IMAGE FORMING APPARATUS THAT STORES A NUMBER OF DETECTION RESULTS THAT ARE OUTSIDE A PREDETERMINED RANGE

(71) Applicant: Canon Kabushiki Kaisha, Tokyo (JP)

(72) Inventor: Mizuho Ueshima, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/074,791

(22) Filed: Oct. 20, 2020

(65) Prior Publication Data

US 2021/0117137 A1 Apr. 22, 2021

(30) Foreign Application Priority Data

Oct. 21, 2019 (JP) .............................. JP2019-192043

(51) Int. Cl.
*H04N 1/00* (2006.01)
*G06F 3/12* (2006.01)

(52) U.S. Cl.
CPC .......... *G06F 3/1219* (2013.01); *G06F 3/1229* (2013.01); *H04N 1/00344* (2013.01); *H04N 1/00543* (2013.01)

(58) Field of Classification Search
None
See application file for complete search history.

(56) References Cited

U.S. PATENT DOCUMENTS

| 6,594,451 | B2* | 7/2003 | Kakeshita | G03G 21/1889 399/24 |
| 8,175,849 | B2* | 5/2012 | Yamashita | G03G 15/502 702/184 |
| 8,768,186 | B2* | 7/2014 | Imazeki | G03G 15/657 399/36 |
| 9,091,990 | B2* | 7/2015 | Imazeki | G03G 15/55 |
| 9,185,250 | B2* | 11/2015 | Narahashi | H04N 1/00411 |
| 9,229,409 | B2* | 1/2016 | Imazeki | G03G 21/0011 |
| 2004/0114947 | A1* | 6/2004 | Geleynse | G03G 15/55 399/297 |
| 2005/0157327 | A1* | 7/2005 | Shoji | G06F 11/0751 358/1.14 |

(Continued)

FOREIGN PATENT DOCUMENTS

JP 2005266380 A 9/2005

*Primary Examiner* — Henok Shiferaw
(74) *Attorney, Agent, or Firm* — Venable LLP

(57) ABSTRACT

An image forming apparatus includes an operating part configured to form an image, a detection unit configured to detect a status of the operating part to generate sequential data which is updated sequentially, a determination unit configured to determine whether the sequential data satisfies a predetermined condition or not, a storage unit configured to store the number of times of determination of whether the sequential data satisfies the predetermined condition or not, a preprocessing unit, and an accumulation unit. The preprocessing unit is configured to generate data, having a data size smaller than that of the sequential data, to be used for predicting a state of the operating part. Further, the accumulation unit is configured to accumulate the data based on the sequential data which is determined to satisfy the predetermined condition by the determination unit.

16 Claims, 11 Drawing Sheets

(56) References Cited

U.S. PATENT DOCUMENTS

| | | | |
|---|---|---|---|
| 2005/0254830 A1* | 11/2005 | Maeda | H04N 1/00076 |
| | | | 399/24 |
| 2008/0288210 A1* | 11/2008 | Imahara | G05B 23/0297 |
| | | | 702/182 |
| 2009/0033993 A1* | 2/2009 | Nakazato | G06F 3/1286 |
| | | | 358/1.15 |
| 2012/0288198 A1* | 11/2012 | Tojo | G06V 20/52 |
| | | | 382/173 |
| 2020/0134407 A1* | 4/2020 | Shinagawa | G06K 15/4075 |
| 2020/0201228 A1* | 6/2020 | Kawaguchi | G06F 3/1229 |

* cited by examiner (FORMULA 1)
$$\text{REFERENCE ESTIMATED VALUE} = k_1 \times X_1$$

(FORMULA 2)
$$\text{TARGET DENSITY DIFFERENCE} = bk_1 \times B_1 - bk_2 \times B_2$$

(FORMULA 3)
$$\text{PHOTOSENSITIVE DRUM ENDURANCE VALUE} = dk_1 \times D_1 + dk_2 \times D_2$$

(FORMULA 4)
ERROR-CORRECTED ESTIMATED VALUE OF TONER REPLENISHMENT AMOUNT $$= (k_1 + k_2 \times X_2 + k_3 \times X_3 + k_4 \times X_4 + k_5 \times X_5 + k_6 \times X_6 + k_7 \times X_7 + k_8 \times X_8) \times X_1$$
$$= (k_1 + k_2 \times X_2 + k_3 \times X_3 + k_4 \times X_4 + k_5 \times X_5 + k_6 \times X_6 + k_7 \times X_7 + dk_1 \times D_1 + dk_2 \times D_2) \times X_1$$
$$= (k_1 + k_2 \times X_2 + k_3 \times X_3 + k_4 \times X_4 + k_5 \times X_5 + k_7 \times X_7 + k_8 \times X_8 + bk_1 \times B_1 - bk_2 \times B_2) \times X_1$$
$$= (k_1 + k_2 \times X_2 + k_3 \times X_3 + k_4 \times X_4 + k_5 \times X_5 + k_7 \times X_7 + bk_1 \times B_1 - bk_2 \times B_2 + dk_1 \times D_1 + dk_2 \times D_2) \times X_1$$

$X_1$: REPLENISHMENT OPERATION COUNT AFTER PREPROCESSING
$B_1$: TONER TARGET DENSITY IN DEVELOPER AFTER PREPROCESSING
$B_2$: TONER DENSITY IN DEVELOPER AFTER PREPROCESSING
$D_1$: TOTAL DRIVE DISTANCE OF PHOTOSENSITIVE DRUM AFTER PREPROCESSING
$D_2$: TOTAL CHARGING TIME OF PHOTOSENSITIVE DRUM AFTER PREPROCESSING
$X_2$: NUMBER OF REPLENISHMENT OPERATIONS 1 AFTER PREPROCESSING
$X_3$: NUMBER OF REPLENISHMENT OPERATIONS 2 AFTER PREPROCESSING
$X_4$: ACCUMULATED DOT COUNT NUMBER AFTER PREPROCESSING
$X_5$: TARGET DENSITY DIFFERENCE AFTER PREPROCESSING
$X_6$: PATCH DENSITY AFTER PREPROCESSING
$X_7$: RELATIVE HUMIDITY IN DEVELOPER AFTER PREPROCESSING
$X_8$: PHOTOSENSITIVE DRUM ENDURANCE VALUE $k_1$: CONSTANT COEFFICIENT FOR NUMBER OF REPLENISHMENT OPERATIONS
$bk_1$: CONSTANT COEFFICIENT FOR TONER TARGET DENSITY IN DEVELOPER
$bk_2$: CONSTANT COEFFICIENT FOR TONER DENSITY IN DEVELOPER
$dk_1$: CONSTANT COEFFICIENT FOR PHOTOSENSITIVE DRUM TOTOAL DRIVE DISTANCE
$dk_2$: CONSTANT COEFFICIENT FOR PHOTOSENSITIVE DRUM TOTAL CHARGING TIME
$k_2$: NUMBER OF REPLENISHMENT OPERATION PATTERNS 1 AFTER PREPROCESSING
$k_3$: NUMBER OF REPLENISHMENT OPERATION PATTERNS 2 AFTER PREPROCESSING
$k_4$: ACCUMULATED NUMBER OF DOT COUNT NUMBER AFTER PREPROCESSING
$k_5$: TARGET DENSITY DIFFERENCE AFTER PREPROCESSING
$k_6$: PATCH DENSITY AFTER PREPROCESSING
$k_7$: RELATIVE HUMIDITY IN DEVELOPER AFTER PREPROCESSING
$k_8$: PHOTOSENSITIVE DRUM ENDURANCE VALUE (FORMULA 5)
$$\sum_{i}^{n} k X_i = k \sum_{i}^{n} X_i$$

$k$: PREDETERMINED CONSTANT COEFFICIENT
$X_i$: VARIABLE FOR (i)TH PREDETERMINED PERIOD
$n$: (n)TH PREDETERMINED PERIOD AT THE TIME OF COMPLETION OF ESTIMATED VALUE OPERATION

FIG. 7

(FORMULA 1-1)

ESTIMATED VALUE 1 OF FILM THICKNESS ABRASION AMOUNT OF PHOTOSENSITIVE DRUM
$= k_1 \times X_1 + k_2 \times X_2$ (FORMULA 1-2)

ESTIMATED VALUE 2 OF FILM THICKNESS ABRASION AMOUNT OF PHOTOSENSITIVE DRUM
$= l_1 \times X_1 + l_2 \times X_2$ $X_1$: PHOTOSENSITIVE DRUM TOTAL DRIVE DISTANCE AFTER PREPROCESSING
$X_2$: PHOTOSENSITIVE DRUM TOTAL CHARGING TIME AFTER PREPROCESSING (ABRASION AMOUNT PREDICTION FORMULA 1)
$k_1$: CONSTANT COEFFICIENT FOR PHOTOSENSITIVE DRUM TOTAL DRIVE DISTANCE
$k_2$: CONSTANT COEFFICIENT FOR PHOTOSENSITIVE DRUM TOTAL CHARGING TIME (ABRASION AMOUNT PREDICTION FORMULA 2)
$l_1$: CONSTANT COEFFICIENT FOR PHOTOSENSITIVE DRUM TOTAL DRIVE DISTANCE
$l_2$: CONSTANT COEFFICIENT FOR PHOTOSENSITIVE DRUM TOTAL CHARGING TIME (FORMULA 2)

ESTIMATED VALUE 1 OF FILM THICKNESS ABRASION AMOUNT OF PHOTOSENSITIVE DRUM
$= k_1 \times X_1 + k_2 \times X_2$
$= k_1 \times (x_{n1} - x_{11}) + k_2 \times (x_{n2} - x_{12})$ ESTIMATED VALUE 2 OF FILM THICKNESS ABRASION AMOUNT OF PHOTOSENSITIVE DRUM
$= l_1 \times X_1 + l_2 \times X_2$
$= l_1 \times (x_{n1} - x_{11}) + l_2 \times (x_{n2} - x_{12})$

LIST OF PREPROCESSING METHOD

CHANGE AMOUNT $X_1^i := x_{n1}^i - x_{11}^i$

CHANGE AMOUNT $X_2^i := x_{n2}^i - x_{12}^i$ (FORMULA 3)

$$\sum_{i}^{n} k X_i = k \sum_{i}^{n} X_i$$

$k$: PREDETERMINED CONSTANT COEFFICIENT
$X_i$: VARIABLE FOR (i)TH PREDETERMINED PERIOD
$n$: (n)TH PREDETERMINED PERIOD AT THE TIME OF COMPLETION OF ESTIMATED VALUE OPERATION

FIG. 8

(FORMULA 1)

COLOR MISREGISTRATION AMOUNT ESTIMATED VALUE
$= k_1 \times X_1 + k_2 \times X_2$ $X_1$: TEMPERATURE IN LIGHT SCANNING APPARATUS AFTER PREPROCESSING
$X_2$: AMBIENT TEMPERATURE AROUND DEVELOPER AFTER PREPROCESSING $k_1$: CONSTANT COEFFICIENT FOR TEMPERATURE IN LIGHT SCANNING APPARATUS
$k_2$: CONSTANT COEFFICIENT FOR AMBIENT TEMPERATURE AROUND DEVELOPER (FORMULA 2)

COLOR MISREGISTRATION AMOUNT ESTIMATED VALUE
$= k_1 \times X_1 + k_2 \times X_2$
$= k_1 \times (x_{n1} - x_{11}) + k_2 (x_{n2} - x_{12})$

LIST OF PREPROCESSING METHOD

CHANGE AMOUNT $X_1^i := x_{n1}^i - x_{11}^i$

CHANGE AMOUNT $X_2^i := x_{n2}^i - x_{12}^i$ (FORMULA 3)

$$\sum_{i}^{n} k X_i = k \sum_{i}^{n} X_i$$

$k$: PREDETERMINED CONSTANT COEFFICIENT
$X_i$: VARIABLE FOR (i)TH PREDETERMINED PERIOD
$n$: (n)TH PREDETERMINED PERIOD AT THE TIME OF COMPLETION OF ESTIMATED VALUE OPERATION

FIG. 10

IMAGE FORMING APPARATUS THAT STORES A NUMBER OF DETECTION RESULTS THAT ARE OUTSIDE A PREDETERMINED RANGE

BACKGROUND OF THE INVENTION

Field of the Invention

The present invention relates to a data collection technology for image forming apparatus which is communicable with an external apparatus.

Description of the Related Art

Copying machine manufacturers often enter a sales contract with customers, who purchased a product, in which costs for maintenance of the product (replacement of parts, replenishment of consumables, repair, etc.) are included. When an image forming apparatus stops operating due to a component failure, a life of consumable, or various malfunctions, productivity is reduced while repairing and replenishing of consumables are performed. It is necessary for the copying machine manufacturers to improve the accuracy of previously predicting the component failure and the life of consumable, in order to shorten a period in which the productivity is reduced as much as possible.

In the development of techniques to previously predict the component failure and the life of consumable, it is generally required to obtain data as much as possible for more accurate predictions. However, it is practically difficult to obtain large amount of data by performing experiments. For this reason, it is considered to implement a system for continuously collecting data even after the product is shipped in order to improve prediction accuracy. However, the image forming apparatus does not always operate normally after shipment. The data obtained from the image forming apparatus during abnormal operation may result in hindering the improvement of the prediction accuracy. Therefore, in Japanese Patent Application Laid-open No. 2005-266380, an operating state of an image forming apparatus is determined from sensor information concerning image quality, and only data (sensor information) acquired during normal operation is used for prediction.

However, in the technology described in Japanese Patent Application Laid-open No. 2005-266380, in an image forming apparatus, it is necessary to obtain data (sensor information) sequentially. As a result, the amount of data accumulated in the image forming apparatus becomes very large. In addition, when the data (sensor information) is sequentially transmitted and received between the external device and the image forming apparatus via the network, the amount of data transmitted between the image forming apparatus and the external device also becomes very large. The data used for predictive control is so-called "Big Data", which increases the amount of processing load (amount of data storage and data communication) of the image forming apparatus and the external device.

For this reason, it is necessary to reduce the amount of data to be accumulated and the amount of data to be communicated by data compression technologies and the like to provide sufficient storage capacity and sufficient communication capacity of the image forming apparatus. However, when the amount of data to be accumulated and the amount of data communication is reduced, the information included in the data is also reduced, and the compressed data cannot be used for improving the prediction accuracy.

Therefore, the present invention is directed to reduce the processing load caused by big data while controlling the reduction of information.

SUMMARY OF THE INVENTION

An image forming apparatus according to the present disclosure includes: an operating part configured to form an image; a detection unit configured to detect a status of the operating part to generate sequential data which is updated sequentially; a determination unit configured to determine whether the sequential data satisfies a predetermined condition or not; a storage unit configured to store the number of times of determination of whether the sequential data satisfies the predetermined condition or not; a preprocessing unit configured to generate data, having a data size smaller than that of the sequential data, to be used for predicting a state of the operating part, and an accumulation unit configured to accumulate the data based on the sequential data which is determined to satisfy the predetermined condition by the determination unit.

Further features of the present invention will become apparent from the following description of exemplary embodiments (with reference to the attached drawings).

BRIEF DESCRIPTION OF THE DRAWINGS

FIG. 7 is an explanatory diagram of a load angle.

FIG. 8 is an explanatory diagram of an abrasion amount of photoconductive layer.

FIG. 10 is an explanatory diagram of color misregistration.

DESCRIPTION OF THE EMBODIMENTS

In the following, at least one embodiment of the present invention is described in detail with reference to the accompanying drawings.

Image Forming Apparatus

Figure 1:
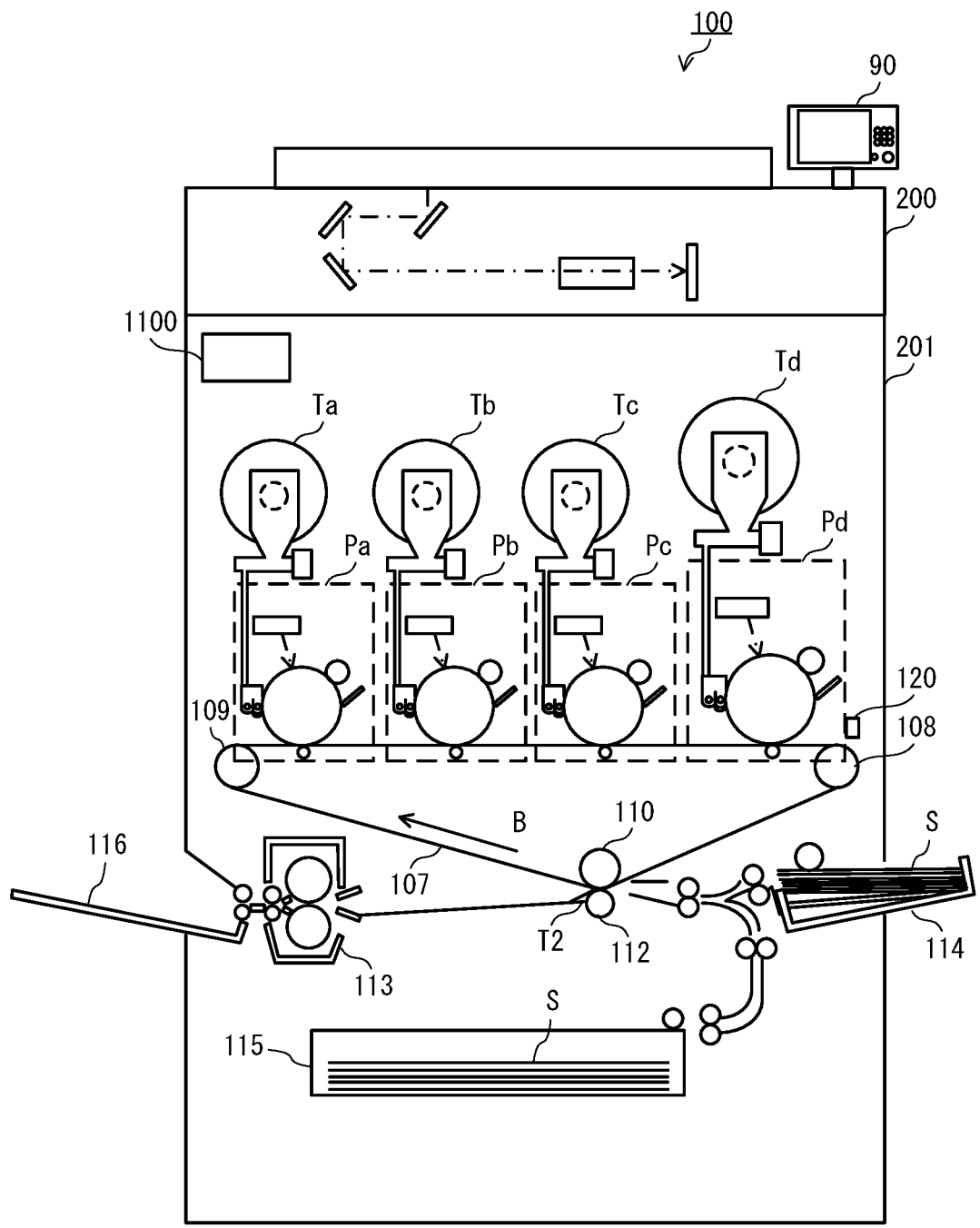
FIG. 1 is a configuration diagram of an image forming apparatus according to at least one embodiment of the present disclosure.

FIG. 1 is a configuration diagram of an image forming apparatus. The image forming apparatus 100 is operable to form full color images using a plurality of color developers. The image forming apparatus 100 includes a reader 200 for reading an image of a document, and a printer 201 for forming an image and operation unit 90. The reader 200 generates image data representing the image read from the document and transmits it to the printer 201. The printer 201 forms the image on a sheet S based on the image data obtained from the reader 200, or the image data input from an external apparatus. The operation unit 90 is a user interface including an input device and an output device. The input device may include various key buttons, such as a numeric keypad, a touch panel, and the like. The output device may include a display, a speaker, and the like. A user can perform print settings, such as setting the number of prints and setting image density, and enter printing instructions via the operation unit 90. Operations of the image forming apparatus 100 is controlled by a built-in controller 1100.

The printer 201 includes image forming sections Pa, Pb, Pc, Pd, an intermediate transfer belt 107, a transfer roller 112, a fixing device 113, a manual feed cassette 114, a sheet feeding cassette 115, and a sheet discharging unit 116. The image forming section Pa forms a yellow toner image. The image forming section Pb forms a magenta toner image. The image forming section Pc forms a cyan toner image. The image forming section Pd forms a black toner image. The intermediate transfer belt 107 is an intermediate transfer member, having a shape of an endless belt, to which the toner image of each color is transferred from image forming sections Pa, Pb, Pc, and Pd. The intermediate transfer belt 107 is tensioned by a driving roller 108 and driven rollers 109 and 110. When the driving roller 108 rotates, the intermediate transfer belt 107 rotates in a direction represented by an arrow B to convey the image.

The transfer roller 112 forms a second nip portion T2, which is for transferring the image borne on the intermediate transfer belt 107 to the sheet S, between the transfer roller 112 and the driven roller 110. A transfer bias is applied to the transfer roller 112 from a high voltage power supply (not shown). Thus, the image on the intermediate transfer belt 107 is transferred to the sheet S between the transfer roller 112 and the intermediate transfer belt 107. The sheet S, to which the image is transferred, is fed from the manual feed cassette 114 or the sheet feeding cassette 115. The fixing device 113 includes two rollers and a heater. The fixing device 113 fixes the image to the sheet S by the pressure of the two rollers and the heat of the heater. The sheet S, on which the image has been fixed by the fixing device 113, is conveyed to the sheet discharging unit 116.

A pattern detection sensor 120 is arranged near the intermediate transfer belt 107 at a downstream side of the image forming section Pd in a rotating direction of the intermediate transfer belt 107 (i.e., a conveying direction of the image). The pattern detection sensor 120 detects a pattern image formed on the intermediate transfer belt 107. The pattern image is an image used for measuring a color misregistration amount and an image density. The pattern detection sensor 120 is an optical sensor having a light emitting portion and a light receiving portion. The light emitting portion has, for example, an LED (Light Emitting Diode) as a light emitting element. The light-receiving section has, for example, a PD (Photo Detector) as a light-receiving element. The pattern detection sensor 120 is disposed at a plurality of locations at different positions in a direction orthogonal to the transport direction of the intermediate transfer belt 107. For example, the pattern detection sensor 120 includes two pattern detection sensors (i.e., a first pattern detection sensor and a second pattern detection sensor). The two pattern detection sensors are disposed at positions which are the same in a conveyance direction of the intermediate transfer belt 107 and are different from each other in a direction orthogonal to the conveyance direction. For example, the image forming apparatus 100 is operable to detect pattern images formed at different positions in the direction orthogonal to the transport direction of the intermediate transfer belt 107 with use of the first and second pattern detection sensors, and is operable to measure the color misregistration amount and the image density based on those detection results.

Removable toner bottles Ta, Tb, Tc, and Td are removably attached to the printer 201. Each of the toner bottles Ta, Tb, Tc, and Td corresponds to a toner container which houses the toner. The toner bottle Ta is filled with the yellow toner. The yellow toner is replenished from the toner bottle Ta to the image forming section Pa. The toner bottle Tb is filled with the magenta toner. The magenta toner is replenished from the toner bottle Tb to the image forming section Pb. The toner bottle Tc is filled with the cyan toner. The cyan toner is replenished from the toner bottle Tc to the image forming section Pc. The toner bottle Td is filled with the black toner. The black toner is replenished with the toner bottle Td to the image forming section Pd.

Figure 2:
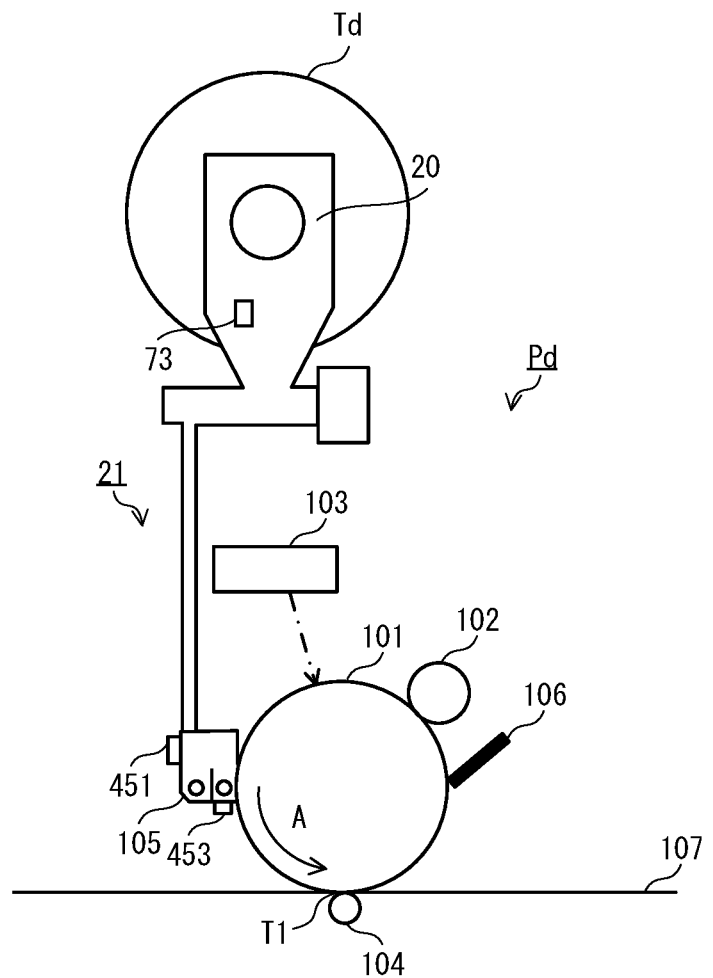
FIG. 2 is an explanatory view of a configuration of an image forming section.

FIG. 2 is a configuration diagram of the image forming section Pd. The image forming sections Pa, Pb, Pc, and Pd have the same configuration except for the color of the image to be formed. The image forming section Pd is provided with a photosensitive drum 101. A photosensitive layer is formed on the surface of the photosensitive drum 101. Provided around the photosensitive drum 101 are the charger 102, the optical scanning apparatus 103, the developer 105, and the drum cleaner 106.

A transfer roller 104 is provided at a position facing the photosensitive drum 101, with the intermediate transfer belt 107 therebetween. The developer 105 is equipped with a temperature sensor 451 for detecting the ambient temperature around the developer 105. A change amount of the ambient temperature detected by the temperature sensor 451 is used when calculating the color misregistration amount without using the pattern image. The temperature sensor 451 is a temperature detection device which detects an ambient temperature of the developer 105. The toner of the corresponding color (i.e., black) is replenished from the toner bottle Td to the developer 105.

Now, the toner replenishment operation from the toner bottle Td to the developer 105 will be described. It is noted that the following description of the toner replenishment operation is also applied to the toner replenishment operation of the toner bottles Ta, Tb, and Tc, each corresponding to the other colors, for replenishing the corresponding developer. The amount of the toner in the developer 105 is detected by an inductance sensor 453 provided in the developer 105. The inductance sensor 453 detects magnetic permeability of the developer contained in the developer 105, and outputs a signal according to a ratio of the toner in the developer. The controller 1100 detects the amount of the toner in the developer in the developer 105 based on the output signal of the inductance sensor 453.

The developer contained in the developer 105 contains a magnetic carrier and the toner. Therefore, in a case where a proportion of toner in the developer (hereinafter referred to as "the toner density in the developer") is increased, the proportion of carriers in the developer is decreased. In this case, an output value of the inductance sensor 453 is decreased. Contrary to this, in a case where the toner density in the developer is decreased, the proportion of carriers in the developer is increased. In this case, the output value of the inductance sensor 453 is increased. That is, the inductance sensor 453 outputs to the controller 1100 a signal (output signal) of the output value according to the rate of the toner in the developer in the developer 105. The controller 1100 sequentially sets a target density of the toner density in the developer. The target density is the toner density in the developer for maintaining an image quality required for the image forming apparatus 100. The controller 1100 calculates a difference (hereinafter, referred to as "target density difference") between the target density and the actual toner density in the developer 105 detected by using the inductance sensor 453.

An image forming section Pd is provided with a dot counter, described in the following, which counts a total sum of the densities of the pixels included in the image for one page based on the image data. The total sum of the counted densities for each pixel (hereinafter referred to as "dot count") corresponds to a toner consumption amount of the toner consumed in the developer 105 by forming a toner image for one page. It is noted that a method of obtaining the dot count is known in the art, therefore, the description thereof is omitted here.

The image forming section Pd includes a mounting portion 20 to which the toner bottle Td is mounted, and a supply motor (not shown). The supply motor is adapted to engage with the toner bottle Td mounted on the mounting portion 20 to rotate the toner bottle Td. The controller 1100 notifies the replenishment motor of a replenishment command when the sum of the toner consumption amount, which is calculated from a detection result of the inductance sensor 453 and the dot count, exceeds a predetermined threshold value. The replenishment motor receives the replenishment command to rotate the toner bottle Td. The toner bottle Td has a cam structure, and a pump portion of the toner bottle Td is expanded and contracted in synchronization with the rotation of the toner bottle to replenish the toner in the toner bottle. This cam configuration is, for example, a configuration in which the pump portion is pressed once every half turn of the toner bottle Td. The toner replenished from the toner bottle Td is supplied to the developer 105 through the transport path 21.

The mounting portion 20 has a photo interrupter 73 for detecting the rotation of the toner bottle Td. The photo interrupter 73 detects that the toner bottle Td has made a half turn, for example, to notify the controller 1100 of the detection result. The configuration of the photo interrupter 73 is known in the art, therefore, the description thereof is omitted here. Upon receiving the detection result of the photo interrupter 73, the controller 1100 notifies the supply motor of a rotation stop command. In this way, the replenishment operation is completed. As described in the above, the toner replenishment operation in the image forming apparatus 100 is an intermittent operation.

Image Forming Process

Now, an image forming process performed in the image forming apparatus 100 having the above configuration will be described. The image forming process is performed by controlling the controller 1100 in the operation control of each unit of the image forming apparatus 100. During image formation, the photosensitive drum 101 is rotated in the direction indicated by an arrow A by a drive motor (not shown). The operation of the drive motor is controlled by the controller 1100. The charger 102 uniformly charges the photosensitive layer on the surface of the photosensitive drum 101. The charged photosensitive drum 101 is exposed to a laser beam emitted from the optical scanning apparatus 103. As a result, an electrostatic latent image is formed on the photosensitive drum 101. The developer 105 develops an electrostatic latent image on the photosensitive drum 101 as a toner image. When forming a monochrome image, an image is formed only in the image forming section Pd. When forming a full-color image, an image is formed for each color in each of the corresponding image forming sections Pa, Pb, Pc, and Pd. Drive time of the drive motor, which rotates the photosensitive drum 101, is measured by the controller 1100. The charging time of the photosensitive drum by the charger 102 is measured by the controller 1100.

The toner image formed on the photosensitive drum 101 is conveyed to the first nip portion T1, by the rotation of the photosensitive drum 101, formed between the photosensitive drum 101 and the intermediate transfer belt 107. A transfer bias is applied to the transfer roller 104, and the toner image on the photosensitive drum 101 is transferred to the intermediate transfer belt 107. When forming the monochrome image, the black toner image formed by the image forming section Pd is transferred to the intermediate transfer belt 107. When forming the full-color image, the toner images of respective colors formed by the image forming sections Pa, Pb, Pc, and Pd are sequentially superposed and transferred on the intermediate transfer belt 107. The remaining toner, which is not transferred from the photosensitive drum 101 on the intermediate transfer belt 107, is removed by the drum cleaner 106.

The toner image on the intermediate transfer belt 107 is conveyed to the second nip portion T2 as the intermediate transfer belt 107 rotates in the arrow B direction. In the second nip portion T2, the toner image on the intermediate transfer belt 107 is transferred on the sheet S conveyed from the manual feed cassette 114 or the sheet feeding cassette 115. The sheet S on which the toner image is transferred is conveyed from the second nip portion T2 to the fixing device 113. The fixing device 113 fixes the toner image on the sheet S. The sheet S on which the toner image is fixed is discharged to the sheet discharging unit 116.

Figure 3A:
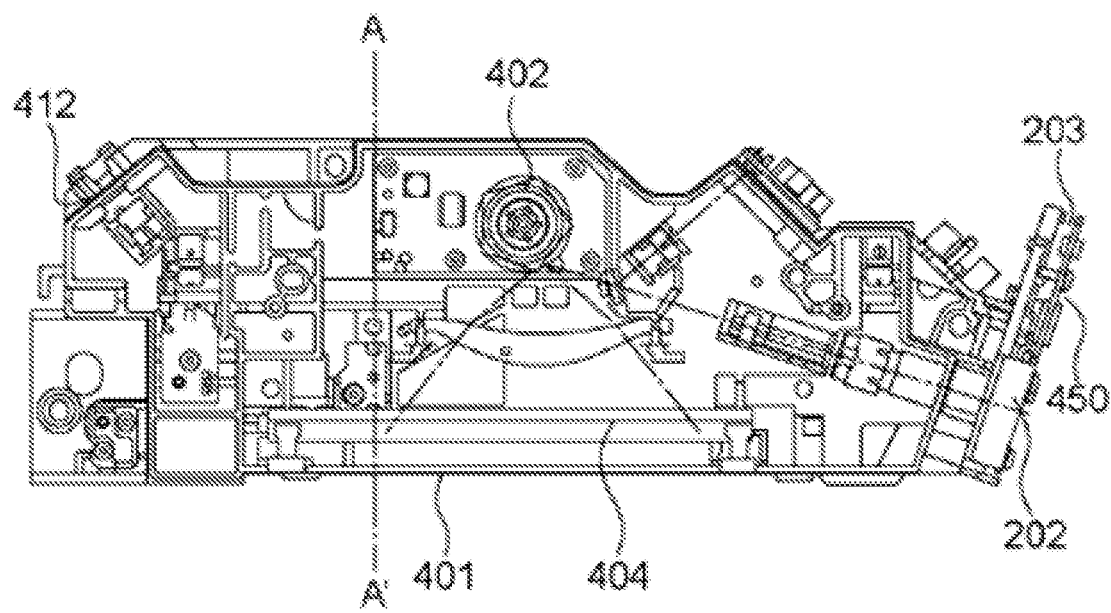
FIG. 3A and FIG. 3B are explanatory views of a light scanning apparatus.
Figure 3B:
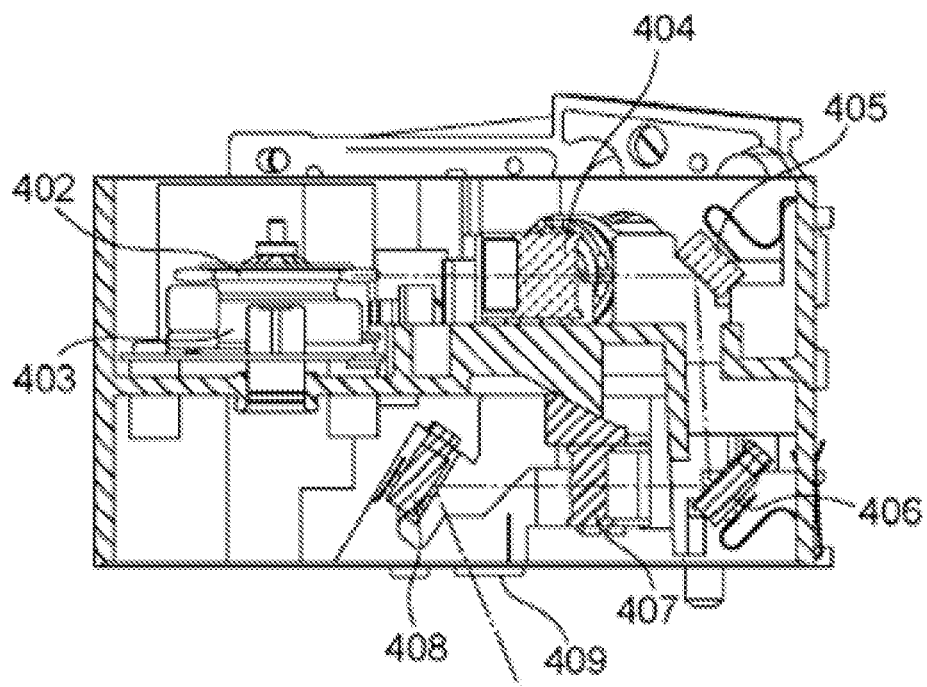

FIG. 3A and FIG. 3B are explanatory diagrams of the optical scanning apparatus 103. FIG. 3A is a top view of the optical scanning apparatus 103. FIG. 3B is a cross-sectional view taken along the line A-A" in FIG. 3A. The optical scanning apparatus 103 includes an optical box 401, a light source 202 which emits a laser beam, and a control board 203 for controlling the light source 202. The light source 202 and the control board 203 are attached to the outside of the optical box 401. Inside the optical box 401, a rotating polygon mirror 402, a motor 403, an fθ lens 404, reflection mirrors 405 and 406, an fθ lens 407, and a reflection mirror 408 are arranged so that the laser beam scans the photosensitive drum 101 in a predetermined direction.

The rotating polygon mirror 402 deflects the laser beam emitted from the light source 202. The rotating polygon mirror 402 is rotationally driven by the motor 403. The laser beam deflected by the rotating polygon mirror 402 enters the fθ lens 404. The laser beam that has passed through the fθ lens 404 is reflected by the reflection mirrors 405 and 406 to enter the fθ lens 407. The laser beam passing through the fθ lens 407 is reflected by the reflection mirror 408 toward the photosensitive drum 101. The optical box 401 is equipped with dustproof glass 409. The laser beam reflected by the reflection mirror 408 passes through the dustproof glass 409 to expose the photosensitive drum 101. The laser beam deflected at a constant angular velocity by the rotation of the rotating polygon mirror 402 passes through the fθ lenses 404 and 407 to form an image on the photosensitive drum 101, and scans the photosensitive drum 101 at a constant velocity.

The optical scanning apparatus 103 includes a beam detector 412 (hereinafter referred to as "BD412"). The BD 412 generates a synchronization signal for determining, as to the photosensitive drum 101, a scanning timing with the laser beam. The laser beam deflected by the rotating polygon mirror 402 passes through the fθ lens 404, then, the laser beam is reflected by the reflection mirror 405 and the BD mirror (not shown), and is detected by the BD 412. A temperature sensor 450, which detects a temperature of the optical scanning apparatus 103, is provided on the control board 203. The temperature sensor 450 serves as a temperature detection device which detects the temperature of the optical scanning apparatus 103.

In the following description, the image forming section Pa, Pb, Pc, Pd, and the toner bottles Ta, Tb, Tc, Td are referred to as an image forming section P and the toner bottle T when it is not necessary to distinguish the colors. Further, the controller 1100 includes, for example, a CPU (Central Processing Unit), a ROM (Read Only Memory), and a RAM (Random Access Memory). The CPU realizes various functions of the controller 1100 by executing computer programs stored in the ROM. In this case, the RAM provides a work area.

In the present embodiment, a description will be described in which the controller 1100 performs a toner collection amount estimation, data collection for estimating the life of the photosensitive drum 101, and data collection for estimating the color misregistration amount. When the controller 1100 operates as a presage prediction apparatus, the controller 1100 predicts a failure of the image forming apparatus 100 and a life of a consumable item based on the collected data. When the presage prediction apparatus is an external device provided separately from the image forming apparatus 100, the controller 1100 transmits the data collected when each function is realized to the presage prediction apparatus. The presage prediction apparatus predicts the failure of the image forming apparatus 100 or the life of the consumable item based on the data obtained from the controller 1100.

Estimation of Toner Replenishment Amount

Figure 4:
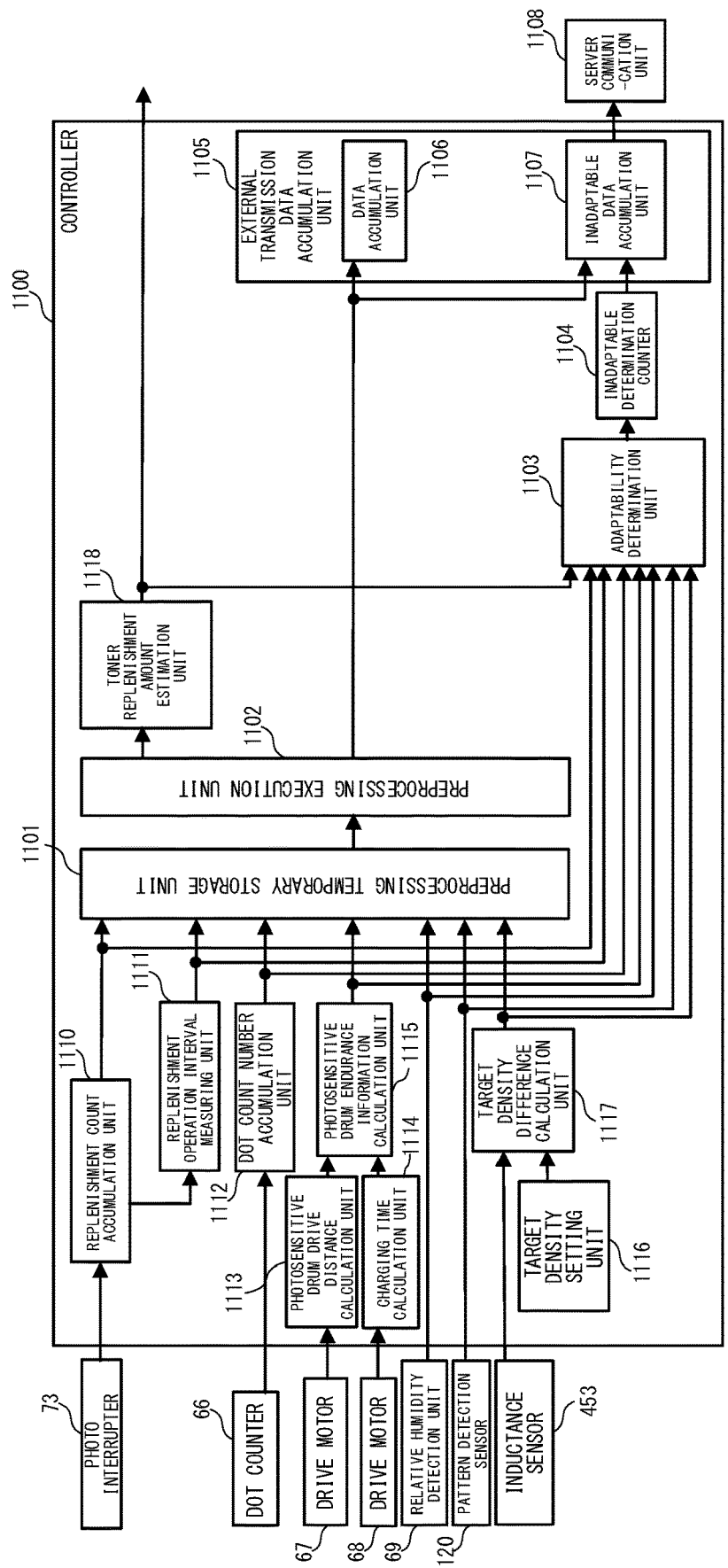
FIG. 4 is a configuration diagram of a controller.

The controller 1100 functions as a presage prediction device which estimates the toner remaining amount in the toner bottle T by estimating an amount of the toner replenished from the toner bottle T to the developer 105. Since the remaining toner amount changes depending on various factors such as a usage condition of the user, it is necessary to obtain data after product shipment in order to realize more accurate estimation. FIG. 4 is a configuration diagram of the controller 1100 having a function of estimating the toner remaining amount in the toner bottle T.

The controller 1100 functions as a replenishment count accumulation unit 1110, a replenishment operation interval measurement unit 1111, a dot count number accumulation unit 1112, a photosensitive drum drive distance calculation unit 1113, a charging time calculation unit 1114, and a photosensitive drum endurance information calculation unit 1115. The toner replenishment amount is estimated by these functions. The controller 1100 functions as a target density setting unit 1116 and a target density difference calculation unit 1117. With these functions, the toner density in the developer 105 is controlled to be the target density. The controller 1100 functions as a preprocessing temporary storage unit 1101, a preprocessing execution unit 1102, a toner replenishment amount estimation unit 1118, an adaptability determination unit 1103, an inadaptable determination counter 1104, and an external transmission data accumulation unit 1105. The external transmission data accumulation unit 1105 includes a data accumulation unit 1106 and an inadaptable data accumulation unit 1107. With these functions, data used for presage prediction is generated and sored.

The photo interrupter 73 provided in the mounting portion 20 of each toner bottle Ta to Td, sensors and motors and the like in each of the image forming sections Pa to Pd, and the server communication unit 1108 are connected to the controller 1100. Each of the sensors, motors, and the like in each of the image forming sections Pa to Pd includes a dot counter 66, a drive motor 67 for the photosensitive drum 101, a drive motor 68 for the charger 102, a relative humidity detection unit 69 in the developer 105, the pattern detection sensor 120, and the inductance sensor 453.

Figure 5:
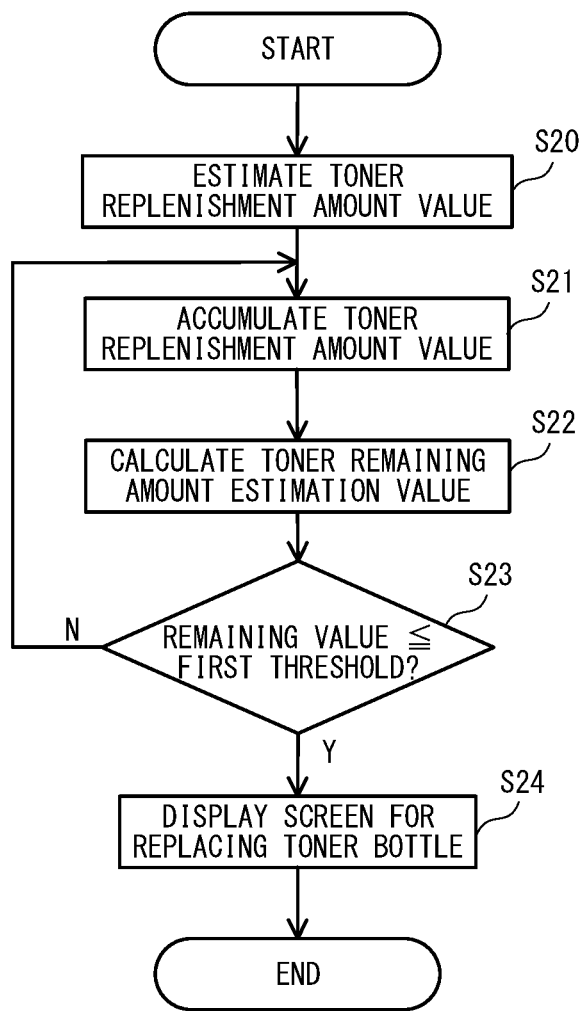
FIG. 5 is a flowchart representing estimation processing of a toner replenishment amount.
Figure 6:
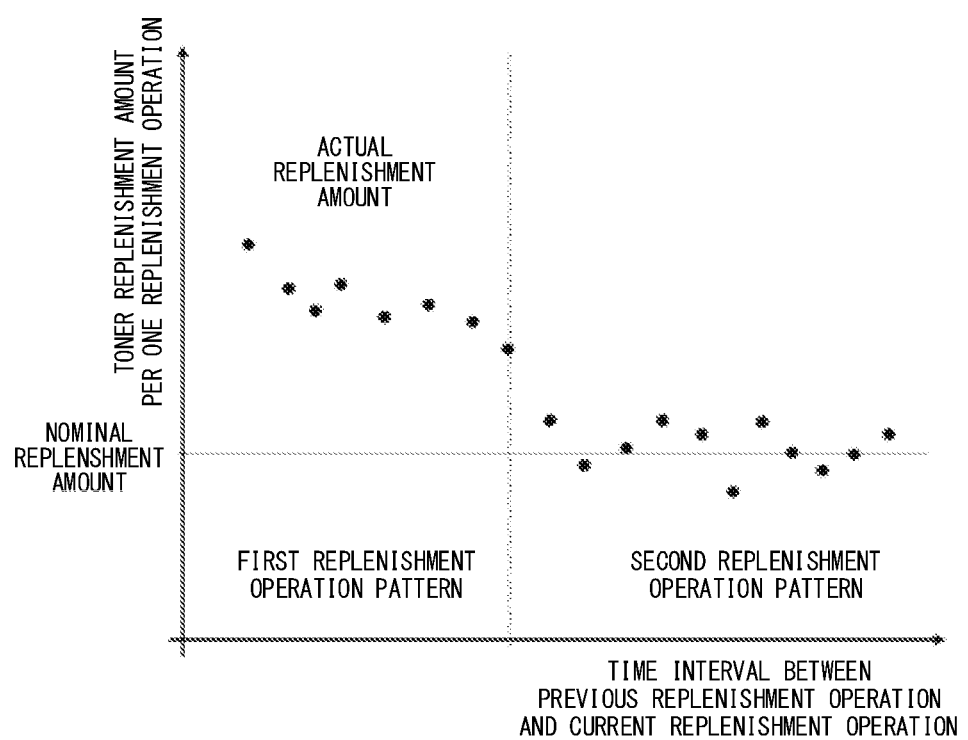
FIG. 6 is an explanatory diagram of a toner replenishment amount.

FIG. 5 is a flowchart showing the toner replenishment amount estimation processing performed by the controller 1100. FIG. 6 is an explanatory diagram of the toner replenishment amount replenished to the developer 105 in one replenishment operation by the toner bottle T. FIG. 7 is an explanatory diagram of estimated values.

The toner replenishment amount per one toner replenishment operation may vary due to various factors. Therefore, even if the toner replenishment amount is simply calculated based on the cumulative result of the number of replenishment times, it is difficult to accurately estimate the toner remaining amount in the toner bottle T. The controller 1100 performs error correction for each item considered to be a factor, which is derived from the replenishment operation, of the variation in the toner replenishment amount to calculate an estimated error-corrected value R1 of the toner replenishment amount. The estimated error-corrected value R1 of the toner replenishment amount may be calculated for each replenishment operation or for every two or more replenishment operations, and the calculation timing may be arbitrary determined. Further, the calculation timing may be variable. The period in which the replenishment operations are performed at an arbitrarily determined number is hereinafter referred to as a "predetermined period". In the following description, the estimation of the toner replenishment amount and the error correction performed during one unit of the predetermined period will be described.

Firstly, the controller 1100 accumulates the number of toner replenishment operations in the predetermined period. The replenishment count accumulation unit 1110 counts the number of times the photo interrupter 73 detects the rotation of the toner bottle T. Thereby the number of times the toner replenishment operations have been performed (replenishment operation count) over a specified period of time is accumulated. In a case where there is no variation in the toner replenishment amount per one replenishment operation, it is possible to estimate the toner replenishment amount in a predetermined period by multiplying the number of replenishment operations by a predetermined constant. The predetermined constant is a theoretical value of the toner replenishment amount per one replenishment operation. It is noted that the theoretical value is previously found. The estimated value R0 of the toner replenishment amount in a case where there is no variation is referred to as a reference estimated value (see "FORMULA 1" in FIG. 7). The replenishment count accumulation unit 1110 accumulates the calculated reference estimated value R0 in the preprocessing temporary storage unit 1101. The controller 1100 can estimate the toner replenishment amount more accurately by adding the error correction value considering the variation to the reference estimated value. The information required for the error correction value will be described below.

The fluidity of the toner changes according to the time interval between the current replenishment operation and the previous replenishment operation (hereinafter referred to as "replenishment operation interval"). Due to this, the toner replenishment amount per one replenishment operation of the toner bottle T changes. Therefore, in the toner replenishment operation, the toner replenishment amount per one replenishment operation differs depending on the replenishment operation interval. In the following description, it is assumed that there are two replenishment operations, i.e., a first replenishment operation pattern and a second replenishment operation pattern in which the replenishment amount per one replenishment operation is lower than the first replenishment operation pattern. The replenishment operation interval measurement unit 1111 measures the replenishment operation interval based on the timing when the photo interrupter 73 detects rotation of the toner bottle T. The replenishment operation interval measurement unit 1111 classifies the replenishment operation into a first replenishment operation pattern and a second replenishment operation pattern based on the measured replenishment operation interval (see FIG. 6).

When the number of times the toner replenishment operations have been performed in the predetermined period is two or more, the replenishment operation interval measurement unit 1111 counts up the number of times of the replenishment operations which is classified into the first replenishment operation pattern by the number of times the toner replenishment operation has been performed during the period. On the other hand, when the number of times the toner replenishment operations has been performed in the predetermined period is less than two, the replenishment operation interval measurement unit 1111 counts up the number of the replenishment operations which is classified into the second replenishment operation pattern. The replenishment operation interval measurement unit 1111 accumulates the number of the replenishment operations classified into the first replenishment operation pattern and the number of replenishment operations classified into the second replenishment operation pattern in the preprocessing temporary storage unit 1101. In the present embodiment, the toner replenishment operation is classified into two types of replenishment operation patterns, however, the number of types of classifications may be set arbitrarily, e.g., three or more types, and the classification reference values also may be set arbitrarily.

The dot count number accumulation unit 1112 acquires dot count number, which is the total sum of the densities of the pixels included in the image for one page, from the dot counter 66 described above. The dot count number accumulation unit 1112 accumulates the total value, which is obtained by accumulating the obtained dot count numbers for a predetermined period, in the preprocessing temporary storage unit 1101. By this, the amount of the toner consumed in the predetermined period is estimated.

As described in the above, the toner replenishing operation is performed according to the toner density in the developer 105 detected by using the inductance sensor 453. In general, in a case where the remaining amount of the toner in the toner bottle T is decreased, the followability of the toner density in the developer 105 to the target density decreases. This is due to the fact that the remaining amount of the toner in the toner bottle T is decreased, the amount of the toner replenishment per one replenishment operation is decreased as compared with the amount of the toner replenishment per one replenishment operation when the remaining amount of the toner is large. Therefore, it is necessary to perform the error correction in consideration of the followability of the toner density in the developer 105 to the target density. The target density difference calculation unit 1117 obtains the toner density in the developer 105 from the detection result of the inductance sensor 453, and calculates the difference from the target density (target density difference) (see "FORMULA 2" in FIG. 7). The target density is set by the target density setting unit 1116. The target density difference calculation unit 1117 accumulates the target density difference within a predetermined period in the preprocessing temporary storage unit 1101.

The relative humidity detection unit 69 detects the relative humidity inside the developer 105. The relative humidity detection unit 69 accumulates the detected relative humidity in the preprocessing temporary storage unit 1101. In general, when the humidity inside the developer 105 changes, the charge amount of the toner inside the developer 105 also changes, and the amount of the toner consumed during development processing changes. Therefore, it is necessary to perform the error correction of the toner consumption error according to the relative humidity in the developer 105. The relative humidity may be either a measured value obtained by directly measuring the developer 105 or a value calculated from a measured value obtained by measuring temperature and humidity of an area other than the developer 105. In the present embodiment, the latter is employed, and the relative humidity detection unit 69 is arranged around the developer 105. The relative humidity detection unit 69 may be arranged in any part as long as it can detect the relative humidity in the developer 105, and may be arranged in any number.

The change in the charge amount of the toner inside the developer 105 is not governed only by the relative humidity around the developer 105, but also by various other factors such as driving of the developer 105. The toner consumption changes according to the change in the toner charge amount. Therefore, the toner image (pattern image) formed on the surface of the intermediate transfer belt 107 for adjusting the image density is detected by the pattern detection sensor 120. The detection result of the pattern image is obtained, for example, as image density (hereinafter, referred to as "patch density"). The patch density detected by the pattern detection sensor 120 is accumulated in the preprocessing temporary storage unit 1101. In this embodiment, the patch density is measured on the surface of the intermediate transfer belt 107, however, it may be measured on the surface of the photosensitive drum 101.

The toner consumption amount changes depending on the surface condition of the photosensitive drum 101. It is known that the state of the surface of the photosensitive drum 101 changes mainly due to cleaning and charging of the same. Cleaning of the photosensitive drum 101 is performed by a cleaning member, such as the drum cleaner 106, directly contacting the photosensitive layer on the surface of the photosensitive drum 101 during rotational driving of the same. Due to this direct contact, the surface of the photosensitive drum 101 is caused to wear. The state of the surface of the photosensitive drum 101 also changes due to the charging by the charger 102. The surface condition of the photosensitive drum 101 is estimated by multiplying each of the drive distance due to the rotation of the photosensitive drum 101 and the charging time of the charger 102 by a respective predetermined coefficient. Hereafter, this calculation result is referred to as "photosensitive drum endurance value" (see "FORMULA 3" in FIG. 7).

The drive distance due to the rotation of the photosensitive drum 101 is calculated by the photosensitive drum drive distance calculation unit 1113, using the drive time of the drive motor 67 of the photosensitive drum 101. The photosensitive drum drive distance calculation unit 1113 calculates the total drive distance of the photosensitive drum from the drive time of the drive motor 67 in a predetermined period. Further, the photosensitive drum drive distance calculation unit 1113 calculates an average value (hereinafter, referred to as "average total drive distance") for a predetermined period from the total drive distance of the photosensitive drum. The charging time by the charger 102 is calculated by the charging time calculation unit 1114 using the drive time of the drive motor 68 of the charger 102. The charging time calculation unit 1114 calculates the total charging time of the photosensitive drum 101 from the drive time of the drive motor 68 in a predetermined period. Further, the charging time calculation unit 1114 calculates an average value of the total charging time in a predetermined period (hereinafter, referred to as "average total charging time"). The photosensitive drum endurance information calculation unit 1115 calculates, as a photosensitive drum endurance value in a predetermined period, based on the average total drive distance and the average total charging time calculated as described in the above, a value obtained by converting the average total drive distance and the average total charging time using linear combination. The photosensitive drum endurance information calculation unit 1115 accumulates the calculated photosensitive drum endurance value in the preprocessing temporary storage unit 1101.

In the present embodiment, the total drive distance of the photosensitive drum and the total charging time are calculated by measuring the drive time of each of the photosensitive drum 101 and the charger 102. However, the total drive distance of the photosensitive drum and the total charging time may be obtained by any other method. Further, the driving method of each of the photosensitive drum 101 and the charger 102 may be any other method.

The preprocessing execution unit 1102 generates data for calculating the estimated value R1 of the toner replenishment amount from each value (data) for the predetermined period accumulated in the preprocessing temporary storage unit 1101. Hereinafter, the process of converting the data stored in the preprocessing temporary storage unit 1101 into the data for calculating the estimated value R1 of the toner replenishment amount is referred to as "preprocessing". By performing the preprocessing, the size of the data used for the calculation of the estimated value (the presage prediction) is compressed.

The preprocessing execution unit 1102 performs the following processing as preprocessing. The preprocessing execution unit 1102 calculates an increased amount (change amount) of the reference estimated value in a predetermined period based on the reference estimated value accumulated in the preprocessing temporary storage unit 1101. The preprocessing execution unit 1102 calculates, based on the number of the first replenishment operation patterns and the number of second replenishment operation patterns accumulated in the preprocessing temporary storage unit 1101, the increased amount (change amount) of the number the first replenishment operation patterns and the number of the second replenishment operation patterns in the predetermined period. The preprocessing execution unit 1102 calculates, based on the total value of the dot count numbers accumulated in the preprocessing temporary storage unit 1101, an increased amount (change amount) of the dot count numbers in the predetermined period. The preprocessing execution unit 1102 calculates an average value of the target density differences in the predetermined period based on the target density difference in the predetermined period accumulated in the preprocessing temporary storage unit 1101. The preprocessing execution unit 1102 calculates an average value of the relative humidity in the predetermined period based on the relative humidity inside the developer 105 during the predetermined period accumulated in the preprocessing temporary storage unit 1101. The preprocessing execution unit 1102 calculates an average value of patch densities in the predetermined period based on patch densities for the predetermined period accumulated in the preprocessing temporary storage unit 1101. The preprocessing execution unit 1102 calculates an average value of the photosensitive drum endurance values in the predetermined period based on the photosensitive drum endurance values in the predetermined period accumulated in the preprocessing temporary storage unit 1101.

The preprocessing execution unit 1102 generates, as the change amount in the data in the predetermined period, the increased amount of the reference estimated value, the number of the first replenishment operation patterns, the number of the second replenishment operation patterns, and the dot count numbers. Further, the preprocessing execution unit 1102 generates, as the average value of the data in the predetermined period, an average value of the target density differences, an average value of the relative humidity in the developer 105, an average value of the patch densities, and an average value of the photosensitive drum endurance values. The preprocessing execution unit 1102 calculates the error correction value of the toner replenishment amount by multiplying each of the change amounts and the average values by a predetermined coefficient (see "FORMULA 4" in FIG. 7). The toner replenishment amount estimation unit 1118 adds the error correction value of the toner replenishment amount to the increased amount of the reference estimated values to calculate the estimated value R1 (the estimated toner replenishment amount value) of the toner replenishment amount in the predetermined period (Step S20, see FIG. 5).

The toner replenishment amount estimation unit 1118 estimates the toner amount consumed in the toner bottle T (the toner replenishment amount) up to the present time by accumulating the calculated toner replenishment amount estimation values for each predetermined period (Step S21, see FIG. 5). The toner replenishment amount estimation unit 1118 calculates an estimated value of the toner remaining amount in the toner bottle T by subtracting the toner replenishment amount from an initial filling amount of the toner bottle T. As described in the above, processing for estimating the toner remaining amount in the toner bottle T is completed (Step S22, see FIG. 5).

The toner replenishment amount estimation unit 1118 outputs a toner bottle replacement flag at a timing (Step S23: Y, see FIG. 5) when the calculated toner remaining amount estimation value falls below a predetermined first threshold value (for example, 10 g). The controller 1100 notifies the user of the toner bottle replacement flag to indicate that the toner bottle T needs to be replaced (Step S24, see FIG. 5). The notification is performed, for example, by displaying a screen for prompting the user to replace the toner bottle T on the operation unit 90. It should be noted that the first threshold value of the estimated value of the toner remaining amount may be arbitrarily set, and a plurality of first threshold values may be set in accordance with the usage condition and usage range of the user.

The controller 1100 stores the estimated value of the toner remaining amount, which is calculated in the process of Step S22, in a bottle tag, which is a memory mounted on the toner bottle T. This is to ensure that the toner remaining amount can be estimated even in a case where the toner bottle T is replaced with another toner bottle and the same toner bottle T is used again since a sufficient amount of toner is left in the toner bottle T. When a new toner bottle is mounted, the value previously stored in the bottle tag may be used as an initial value of the amount of toner remaining in the toner bottle, alternatively, an initial value stored in a memory of the image forming apparatus 100 may be used.

The processing shown in FIG. 5 is performed for the toner bottles Ta to Td corresponding to the respective colors. That is, the processing shown in FIG. 5 is independently performed for each of the toner bottles Ta to Td corresponding to the respective colors of yellow, magenta, cyan, and black.

Next, a method of compressing the data size of the data acquired for use in improving the accuracy of estimation of the toner remaining amount will be described. The controller 1100 compresses the data size to suppress an increase in traffic.

As described in the above, in this embodiment, preprocessing is performed on the data accumulated in the preprocessing temporary storage unit 1101. By performing preprocessing, the change amount is calculated for each of the reference estimated value, the number of the first replenishment operation patterns, the number of the second replenishment operation patterns, and the dot count number, and, the average value is calculated for each of the target density difference, the relative humidity in the developer 105, the patch density, and the photosensitive drum endurance value. These change amounts and the average value are "variables" used for highly accurate estimation of the toner replenishment amount. An estimated value R1 of the toner replenishment amount for the predetermined period is calculated based on each variable and a predetermined coefficient.

The predetermined period may be set appropriately. In the present embodiment, the estimated value R1 of the toner replenishment amount is calculated for each replenishment operation, with the toner replenishment operation interval being constant, i.e., the predetermined period. The toner replenishing operation interval depends on the usage condition of the user. However, in normal operation, the toner replenishing operation is performed at least once every several minutes. Further, when the toner replenishing operation is continuously performed, at the shortest interval between the toner replenishing operations, the frequency is once a second.

The controller 1100 is operable to transmit data to outside via the server communication unit 1108. The server communication unit 1108 is a communication interface in communication with a server apparatus which is an external apparatus different from the image forming apparatus 100. The communication frequency can be set arbitrarily, for example, the communication frequency is set to be once every 16 hours. Further, in addition to the above timing, i.e., once every 16 hours (regular timing), is also possible to perform the communication with the outside at irregular timings for each event such as a timing when the estimated remaining amount of the toner bottle T becomes 0, or at a timing when the toner bottle T is replaced.

As described in the above, in the present embodiment, the reference estimated value R0, the number the first replenishment operation patterns, the number of the second replenishment operation patterns, the dot count number, the target density difference, the relative humidity value in the developer 105, patch density, and photosensitive drum endurance value are used to estimate the remaining toner amount. The above data, i.e., reference estimated value R0, etc., are sequentially updated at every sampling time. For example, the sampling time is 1 second. The pieces of data which are sequentially updated are referred to as "sequential data". Conventionally, the sequential data is transmitted from the server communication unit 1108 to the server apparatus once every 16 hours, for example. Therefore, the amount of data accumulated in the controller 1100 becomes very large. In addition, since the amount of data to be transmitted becomes very large, the traffic during communication increases.

The variables used for estimating the toner replenishment amount in the predetermined period is calculated by a preprocess of calculating the change amount or the average value of the sequential data in the predetermined period. That is, to estimate the toner replenishment amount, the sequential data which is obtained before preprocessing is not needed. Therefore, the controller 2100 performs preprocessing on the sequential data every time the predetermined period elapses, and accumulates only variables which have been preprocessed in the external transmission data accumulation unit 1105, and delete the sequential data. The variable is accumulated in the data accumulation unit 1106 of the external transmission data accumulation unit 1105. The preprocessing temporary storage unit 1101 temporarily stores the sequential data in the predetermined period, and deletes the unnecessary sequential data after the preprocessing. The server communication unit 1108 transmits the variable and the estimated value of the toner remaining amount from the external transmission data accumulation unit 1105 to the server apparatus. These pieces of data transmitted to the server apparatus are analyzed, for example, for product development. These pieces of data are much larger than the data obtained in experiments in the course of the development, and the conditions at the time of data acquisition are also diverse. Therefore, collecting these pieces of data leads to the development of better products.

The estimated value R1 of the toner replenishment amount of the present embodiment is calculated by the formula illustrated in "FORMULA 4" of FIG. 7. In order to calculate the estimated value R1 of the toner replenishment amount in the predetermined period, variables in the predetermined period are needed. However, in the present embodiment, the purpose is to calculate the estimated value of the toner remaining amount calculated from the accumulation of the estimated value R1 of the toner replenishment amount. That is, only the accumulated value estimated value R1 of the toner replenishment amount for each predetermined period is used to determine the final estimated value of the toner remaining amount. Due to the relationship between the left side and the right side of the equation illustrated in "FORMULA 5" in FIG. 7, 1) a cumulative result of the estimated value R1 of the toner replenishment amount for each predetermined period and 2) a result obtained by adding the variables for each predetermined period to obtain a cumulative result and then multiplying the cumulative result by a predetermined coefficient are found to be equivalent. Therefore, the final estimated value of the toner remaining amount can be calculated if there is a cumulative result of the variables. Thus, as compared to the conventional method of sequentially accumulating all data and then transmitting the data to the outside, in the present embodiment, the cumulative result of variables for each predetermined period is transmitted to the external apparatus, as a result, the data size is significantly reduced and the communication traffic is significantly reduced.

However, the image forming apparatus 100 after shipping does not always operate normally. Therefore, there may be a case in which the obtained data is in a range where the toner replenishment amount estimation cannot be applied. In the present embodiment, the adaptability determination unit 1103 performs adaptability determination using sequential data or the toner replenishment amount estimated value. The result of the adaptability determination is notified from the adaptability determination unit 1103 to the inadaptable determination counter 1104. The inadaptable determination counter 1104 accumulates the number of times of inadaptability determination. The inadaptable determination counter 1104 accumulates cumulative values of the number of times of the inadaptable determination (inadaptable determination count value) in the inadaptable data accumulation unit 1107 of the external transmission data accumulation unit 1105. At this time, variables which are determined to be inadaptable are also stored in the inadaptable data accumulation unit 1107 of the external transmission data accumulation unit 1105. In addition, the variable which is not determined to be inadaptable is accumulated in the data accumulation unit 1106 of the external transmission data accumulation unit 1105.

At an external transmission timing, the server communication unit 1108 transmits the inadaptable determination count value accumulated in the inadaptable data accumulation unit 1107 and the sequential data which is determined to be inadaptable to the external server apparatus. Further, the variable accumulated in the data accumulation unit 1106 and the estimated value of the toner remaining amount are also transmitted to the server apparatus. When the image forming apparatus 100 is not connected to the network, the data in the external transmission data accumulation unit 1105 may be sent to the server apparatus via a portable recording medium or the like.

The server apparatus can analyze the data obtained from the image forming apparatus 100. For example, the server apparatus can perform determination such as determining that the variable or estimated value of the toner remaining amount is used for analysis only when the inadaptable determination count value is "0". The inadaptable determination count value, which serves as a criterion for using the variable or the estimated value of the toner remaining amount for analysis, may be a value other than "0", and it may be arbitrarily set.

Further, the number of the pieces of the data determined to be adaptable is very larger than that of the data determined to be inadaptable, and the data determined to be inadaptable is exceptional. However, this is not the case in the image forming apparatus 100 after shipping. When the number of the pieces of the data determined to be inadaptable is large, the inadaptable determination count value and the sequential data which is determined to be inadaptable are used in order to find the cause.

As described in the above, the adaptability determination of the presage prediction apparatus is performed by the adaptability determination unit 1103. The sequential data of this embodiment includes the reference estimated value R0, the number of the first replenishment operation patterns, the number of the second replenishment operation patterns, the total value of the dot count number, the target density difference, the relative humidity inside the developer 105, the patch density, and the photosensitive drum endurance value. The adaptability determination unit 1103 performs the adaptability determination by setting upper and lower limit values for each sequential data, and comparing each sequential data with the upper and lower limit values. When the sequential data is more than or equal to the upper limit value, or when the sequential data is less than or equal to the lower limit value, the adaptability determination unit 1103 determines that the operation of the image forming apparatus 100 deviates from an adaptable range of the presage prediction apparatus, and determines that the sequential data is inadaptable.

Similarly, the adaptability determination unit 1103 sets upper and lower limits for the estimated value R1 of the toner replenishment amount, and performs the adaptability determination by comparing the estimated value R1 with the upper and lower limits. When the estimation result is more than or equal to the upper limit value, or when the estimation result is less than or equal to the lower limit value, the adaptability determination unit 1103 determines that the operation of the image forming apparatus 100 deviates from the adaptable range of the presage prediction apparatus, and determines that the estimation result is inadaptable.

That is, the adaptability determination unit 1103 determines whether the estimation result is inadaptable or not based on whether the values of the sequential data and the toner replenishment amount are within a predetermined adaptable range adaptable to the presage prediction. The upper and lower limit values may be set arbitrarily, in the present embodiment, they are set based on experimental conditions at the time of the product development. Note that the adaptability determination may be performed by any other methods, and information different from the sequential data may be used for the adaptability determination. Further, the criterion is not limited to the above criterion based on the upper and lower limit values, for example, another criterion such as a change amount between a value obtained by current sampling and a value obtained by several times before the current sampling may be used.

In the above description, the remaining toner amount is predicted based on the toner replenishment amount. As a general method of verifying the prediction accuracy, the estimated value R1 of the total toner replenishment amount per toner bottle is often compared with the actual replenishment amount. Therefore, even if the operation of the image forming apparatus 100 is out of the adaptable range of the toner replenishment amount estimation unit 1118 at some timing, it may be acceptable in view of a degree of influence on the estimated value per toner bottle. If the number of times of determining that the estimation result is inadaptable transmitted to the server apparatus is less than or equal to ten, it may be regarded as data that is acceptable to be used for accuracy improvement. In that case, the inadaptable data accumulation unit 1107 and the data accumulation unit 1106 may be integrated as a technique for further reducing the data size/traffic. Of course, the acceptable number of times of determining that the estimation result is inadaptable is not limited to ten, and the acceptable number may set arbitrarily.

Life Estimation of Photosensitive Drum

As described in the above, the photosensitive layer on the surface of the photosensitive drum 101 is gradually worn due to deterioration because of mechanical rubbing with the rotating drum cleaner 106 and charging by the charger 102. As the wear progresses, the photosensitive drum 101 needs to be replaced. Therefore, it is necessary to provide a mechanism for predicting a wear volume (abrasion amount) of the photosensitive layer of the photosensitive drum 101 in advance to replace the photosensitive drum 101 before the image quality deteriorates.

Cleaning of the photosensitive drum 101 is performed by bringing a cleaning member, such as the drum cleaner 106, into direct contact with the photosensitive layer during rotational driving. Further, the photosensitive layer is also deteriorated by charging the charger 102. The abrasion amount of the photosensitive layer of the photosensitive drum 101 during the predetermined period can be predicted by multiplying each of the increased amount of the driving distance due to the rotation of the photosensitive drum 101 in the predetermined period and the increased amount of the charging time by the charger 102 by a respective predetermined coefficient. FIG. 8 is an explanatory diagram of the abrasion amount of the photosensitive layer of the photosensitive drum 101. The formula shown in FIG. 8 is referred to as "abrasion amount prediction formula".

The charge range of the photosensitive drum 101 differs depending on the size of the sheet S in the drum axis direction of the photosensitive drum 101. Thus, the abrasion amount of the photosensitive layer of the photosensitive drum 101 in the drum axis direction differs depending on the size of the sheet S, and the predetermined coefficient in the abrasion amount prediction formula differs accordingly. In the abrasion amount prediction formula of the present embodiment, for each size of the sheet S, predetermined coefficients, which are different from each other, are set. By using these coefficients, it is possible to accommodate the difference in the abrasion amount of the photosensitive layer of the photosensitive drum 101 in the drum axis direction depending on the size of the sheet S. In the present embodiment, the abrasion amount prediction formula is prepared for each of A3 size sheet and A4 size sheet, which are particularly frequently used (see "FORMULA 1-1" and "FORMULA 1-2" in FIG. 8). It should be noted that a plurality of the abrasion amount prediction formulas may be prepared according to the number of sizes of the corresponding sheets S in the image forming apparatus 100. When only a single size is used for the sheet size S, one abrasion amount prediction formula is used.

As described in the above, in the present embodiment, each of the increased amount of the driving distance due to the rotation of the photosensitive drum 101 in the predetermined period and the increased amount of the charging time by the charger 102 is multiplied by the predetermined coefficients. As a result, the estimated abrasion amount of the photosensitive drum 101 is calculated. These increased amounts are also variables, and the processing of generating the variables by calculating the increased amount for each of the driving distance due to the rotation of the photosensitive drum 101 in the predetermined period and the charging time by the charger 102 is also the preprocessing (see FIG. 8, "FORMULA 2"). As shown in "FORMULA 1-1" and "FORMULA 1-2" in FIG. 8, the estimated abrasion amount is calculated by multiplying the variable by the predetermined coefficients in the predetermined period. Each of the values of the predetermined coefficient differs depending on the size of the sheet S, and the abrasion amount prediction formula is provided for each size of the sheet S.

The predetermined period for predicting the abrasion amount can be set arbitrarily. In this embodiment, a unit period of a print job is a predetermined period. The abrasion of the photosensitive layer of the photosensitive drum 101 is a phenomenon which progresses relatively slowly and is strongly influenced by the size of the sheet S. That is, when a plurality of sheet sizes are used, by predicting the abrasion amount according to the size of the sheet S, it is possible to more accurately predict the abrasion amount. The predetermined period may be longer depending on the required accuracy. In an image forming apparatus which handles only a single size sheet S, the predetermined period may be longer. Further, the predetermined period may be set based on a criterion which is different from that of the print job.

Figure 9:
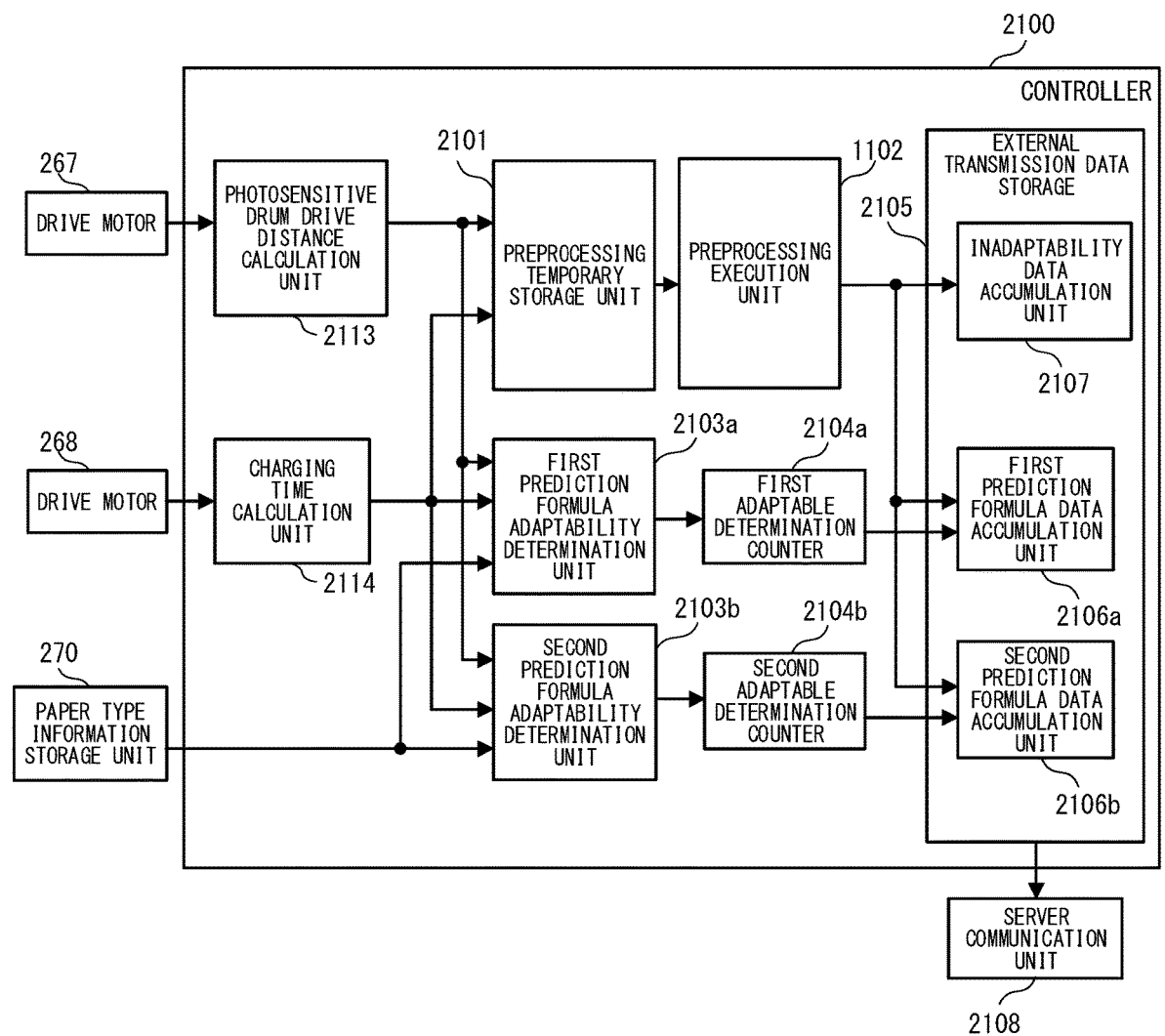
FIG. 9 is a configuration diagram of a controller having a function for estimating an abrasion amount of photoconductive layer.

FIG. 9 is a configuration diagram of a controller 2100 having a function of estimating the life of the photosensitive drum 101 (life estimation) (abrasion amount estimation). The function of the controller 2100 is embodied causing the CPU to execute computer programs stored in the ROM. The controller 2100 is connected to the drive motors 267 and 268, and is also connected to a paper type information storage unit 270. The paper type information storage unit 270 stores information of the type of the sheet S which is used for image formation. In this embodiment, information of the size of the sheet S is stored. The controller 2100 includes photosensitive drum drive distance calculation unit 2113 to which the drive motor 267 is connected, and charging time calculation unit 2114 to which the drive motor 268 is connected.

The controller 2100 can send data to the outside via a server communication unit 2108. The server communication unit 2108 is a communication interface with the server apparatus which is an external device different from the image forming apparatus 100. The communication frequency of the server communication unit 2108 can be set arbitrarily and is, for example, once every 16 hours. In addition to the regular timing, i.e., once every 16 hours, the communication with the outside may be performed at irregular timing for each event, such as when the life estimation of the photosensitive drum 101 becomes 0, or when the photosensitive drum 101 is replaced.

As described in the above, in the present embodiment, the drive distance by the rotation of the photosensitive drum 101 and the charging time by the charger 102 are used for estimating the abrasion amount of the photosensitive drum 101. These pieces of data are sequentially updated at every sampling time. The sampling time is, for example, 1 second. These pieces of data which are sequentially updated is also serial data. Conventionally, the sequential data is transmitted from the server communication unit 2108 to the server apparatus once every 16 hours, for example. Therefore, the amount of data accumulated in the controller 2100 becomes very large. In addition, since the amount of data to be transmitted becomes very large, the traffic during communication also becomes very large.

The variables used for estimating the abrasion amount of the photosensitive drum 101 in the predetermined period is calculated by a preprocess of calculating an increased amount of the sequential data in the predetermined period. That is, the sequential data in the period before the preprocessing is not necessary for estimating the abrasion amount. Therefore, the controller 2100 performs preprocessing on the sequential data every time the predetermined period elapses, and accumulates only variables which have been preprocessed in the external transmission data accumulation unit 1105, and delete the sequential data. The variable is accumulated in a data accumulation unit (a first prediction formula data accumulation unit 2106a, a second prediction formula data accumulation unit 2106b) in the external transmission data storage unit 2105. The preprocessing temporary storage unit 2101 temporarily stores the sequential data in the predetermined period, and deletes the unnecessary sequential data after the preprocessing. The server communication unit 2108 transmits the variable and the estimated abrasion amount from the external transmission data storage unit 2105 to the server apparatus. These pieces of data transmitted to the server apparatus are analyzed, for example, for feeding back to the product development. These pieces of data are much larger than the data obtained in experiments in the course of the development, and the conditions at the time of data acquisition are also diverse. Therefore, collecting these pieces of data leads to the development of better products.

The estimated abrasion amount of the photosensitive drum 101 of the present embodiment is calculated by the exemplary formulas shown in "FORMULA 1-1" and "FORMULA 1-2" in FIG. 8. In order to calculate the estimated abrasion amount of the photosensitive drum 101 in the predetermined period, variables in the predetermined period is needed. One purpose of the present embodiment is to calculate a final total abrasion amount calculated from an accumulated amount of the estimated abrasion amount of the photosensitive drum 101. Thus, in determining the estimated value of the final abrasion amount of the photosensitive drum 101, only the accumulated value of the estimated abrasion amount in each predetermined period. Due to the relationship between the left side and the right side of the equation illustrated in "FORMULA 3" in FIG. 8, 1) a cumulative result of the estimated abrasion amount for each predetermined period and 2) a result obtained by adding the variables for each predetermined period to obtain a cumulative result and then multiplying the cumulative result by a predetermined coefficient are found to be equivalent. Therefore, it is possible to calculate the final estimated total abrasion amount of the photosensitive drum 101 if the cumulative result has been obtained. Therefore, as compared to the conventional method of sequentially accumulating all data and then transmitting the data to the outside, in the present embodiment, the cumulative result of variables for each predetermined period is transmitted to the external apparatus, and it is possible to reduce the data size and the communication traffic.

However, the image forming apparatus 100 after shipping is not always operating normally. Therefore, there may be a case in which the obtained data is in a range where the abrasion amount prediction formula cannot be applied. In the present embodiment, using a first prediction formula adaptability determination unit 2103a and a second prediction formula adaptability determination unit 2103b, the adaptability determination is performed for each of the abrasion amount prediction formulas ("FORMULA 1-1" in FIG. 8 and "FORMULA 1-2" in FIG. 8). It is noted that a standard for the adaptability determination is the size of Sheet S, and both abrasion amount prediction formula cannot be met at the same time. The result of the adaptability determination is notified from the first prediction formula adaptability determination unit 2103a or a second prediction formula adaptability determination unit 2103b to a first adaptable determination counter 2104a or a second adaptable determination counter 2104b, respectively. Each of the first adaptable determination counter 2104a and the second adaptable determination counter 2104b cumulatively count the number of times of determination when the result of the determination is adaptable. The first adaptable determination counter 2104a or the second adaptable determination counter 2104b accumulates the cumulative count value in the first prediction formula data accumulation unit 2106a or the second prediction formula data accumulation unit 2106b in the external transmission data storage unit 2105. Simultaneously, only when the result of the determination is adaptable, the first adaptable determination counter 2104a accumulates the variable in the first prediction formula data accumulation unit 2106a, and the second adaptable determination counter 2104b accumulates the variable in the second prediction formula data accumulation unit 2106b, respectively. In this case, if it is determined that none of the abrasion amount prediction formulas is adaptable for the variable, the variable is accumulated in an inadaptable data accumulation unit 2107.

At the external transmission timing, the server communication unit 2108 transmits the variable at the time of determining inadaptable, which is accumulated in the inadaptable data accumulation unit 2107, to the server apparatus. Further, the variables and the counts determined to be adaptable, which are accumulated in the first prediction formula data accumulation unit 2106a and the second prediction formula data accumulation unit 2106b, are also transmitted to the server apparatus. When the image forming apparatus 100 is not connected to the network, the data in the external transmission data storage unit 2105 may be sent to the server apparatus via a portable recording medium or the like. Finally, the variables are used for the life estimation of the photosensitive drum 101 in the server apparatus.

Estimation of Color Misregistration Amount

The presage prediction apparatus estimates the color misregistration amount. In the optical scanning apparatus 103, a rise in temperature causes deformation of optical members such as lenses and mirrors provided inside and deformation of the optical box 401. Thereby, the relative spatial relationship of the optical scanning apparatus 103 and the photosensitive drum 101 will change. The change of spatial relationship causes misalignment of the positions of the image for each color when the image of each color is overlayed. When the position of the image for each color is not in alignment, the tint of an image will change. This is called "color misregistration".

The image forming apparatus 100 forms a pattern image for color misregistration detection on the intermediate transfer belt 107. The color misregistration amount is actually measured by a detection result of the pattern image by the pattern detection sensor 120. The image forming apparatus 100 performs a color misregistration correction according to the color misregistration amount. However, down time arises by forming the pattern image, and productivity is reduced. Therefore, in the technique employed in this embodiment, by detecting a temperature change of the inside of the optical scanning apparatus 103 and the periphery of the same and estimating the color misregistration amount from an amount of temperature change, the color misregistration correction is performed without forming a pattern image. In the present embodiment, in order to achieve highly precise color misregistration amount prediction, from the image forming apparatus 100 under operation, the data which represents the relation between the color misregistration amount and the amount of temperature changes required for estimating the color misregistration amount is collected.

The optical scanning apparatus 103 is deformed by heat generated by the motor 403, which drives the rotating polygon mirror 402, since the motor 403 serves as a heat source. As illustrated in FIGS. 3A and 3B, the temperature in the optical scanning apparatus 103 is measured by the temperature sensor 450 arranged in the optical scanning apparatus 103. Moreover, there is a heater provided in the fixing device 113 as a large heat source in the image forming apparatus 100. As shown in FIG. 2, a surrounding ambient temperature of the developer 105 is measured by the temperature sensor 451 provided at the image forming section P.

FIG. 10 is an exemplary diagram of the color misregistration. As shown in "FORMULA 1" of FIG. 10, the color misregistration amount is estimated using each of a change amount of temperature in the optical scanning apparatus 103 measured by the temperature sensor 450 and a change amount of ambient temperature of the peripheral of the developer 105 measured by the temperature sensor 451. Each of the change amounts of the temperature in the optical scanning apparatus 103 and the ambient temperature of the peripheral of the developer 105 is also a variable, and the processing of calculating the change amount is also a preprocessing. The color misregistration amount is estimated by multiplying a corresponding predetermined coefficient to each of the variables, respectively.

The image forming apparatus 100 actually measures the color misregistration amount at the predetermined timing. In the present embodiment, a period from a timing at which the color misregistration amount is actually measured to the next timing at which the color misregistration amount is actually measured is defined as a predetermined period.

Figure 11:
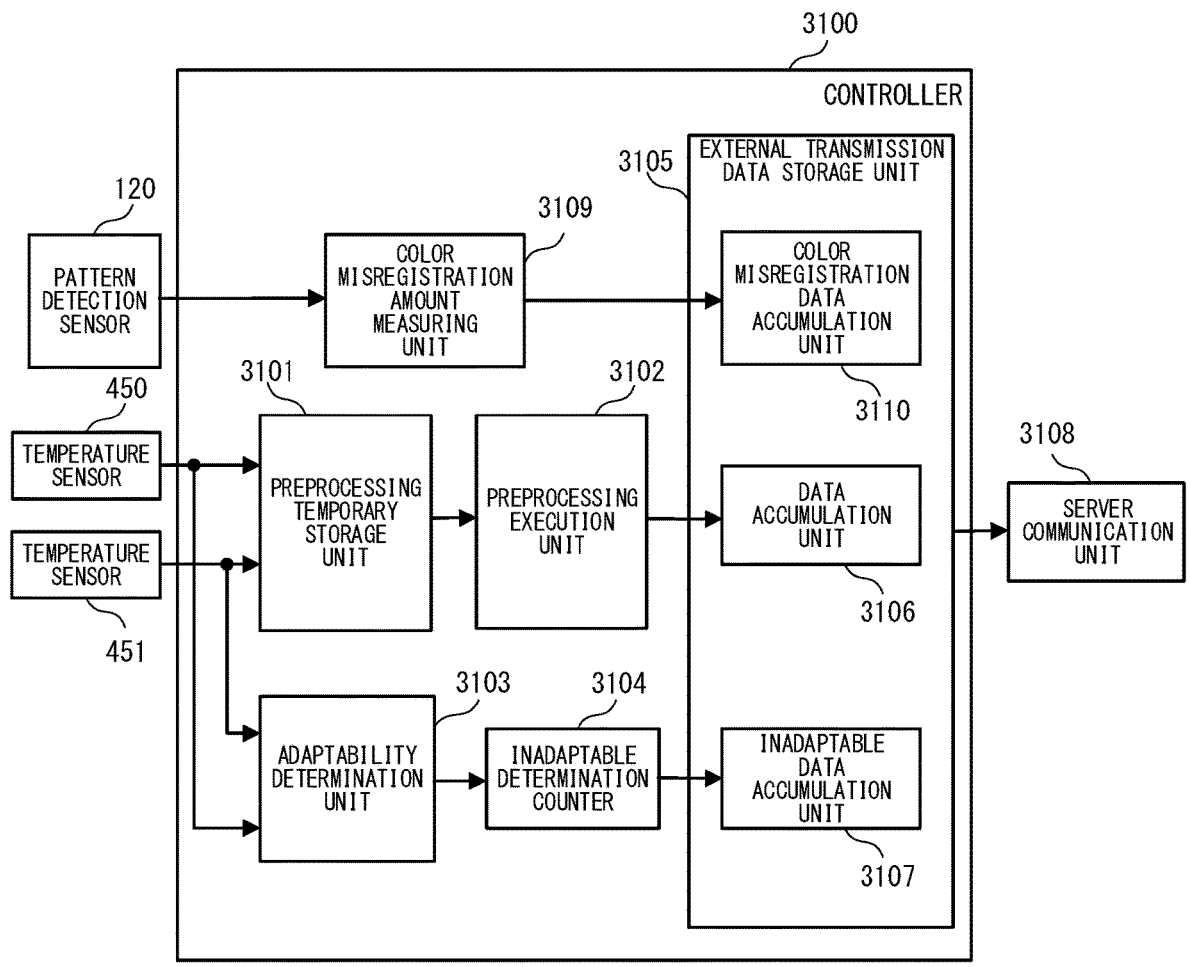
FIG. 11 is a configuration diagram of a controller having a function for estimating an amount of color misregistration.

FIG. 11 is a configuration diagram of a controller having a function for estimating an amount of a color misregistration. The function of the controller 3100 is embodied causing the CPU to execute computer programs stored in the ROM. The controller 3100 does not function as the presage prediction apparatus. The presage prediction apparatus is provided in an apparatus (not shown) which is different from the image forming apparatus 100. The controller 3100 accumulates the variable required for estimating the color misregistration amount, and transmit it to the outside.

The controller 3100 includes a color misregistration amount measurement unit 3109, a preprocessing temporary storage unit 3101, a preprocessing execution unit 3102, an adaptability determination unit 3103, an inadaptable determination counter 3104, and an external transmission data accumulation unit 3105. The external transmission data accumulation unit 3105 includes an inadaptable data accumulation unit 3107, a data accumulation unit 3106, and a color misregistration data accumulation unit 3110. The controller 3100 can send data to the outside via a server communication unit 3108. The server communication unit 3108 is a communication interface with the server apparatus which is an external device different from the image forming apparatus 100. The communication frequency of the server communication unit 3108 can be set arbitrarily and is, for example, once every 16 hours. In addition to the regular timing, i.e., once every 16 hours, the communication with the outside may be performed at irregular timing, such as when various units, e.g., optical scanning apparatus 103 or the developer 105, are replaced.

As described in the above, for estimating the color misregistration amount, each of the temperature in the optical scanning apparatus 103 and the ambient temperature of the peripheral of the developer 105 is used. These pieces of temperature data are sequentially updated at every sampling time. The sampling time is, for example, 1 second. These pieces of data which are sequentially updated is also serial data. Conventionally, the sequential data is transmitted from the server communication unit 3108 to the server apparatus once every 16 hours, for example. Therefore, the amount of data accumulated in the controller 3100 becomes very large. In addition, since the amount of data to be transmitted becomes very large, the traffic during communication also becomes very large.

The variables used for estimating the color misregistration amount in the predetermined period is calculated by a preprocess of calculating a change amount of the sequential data in the predetermined period (see "FORMULA 2" in FIG. 10). That is, the sequential data in the period before the preprocessing is not necessary for estimating the color misregistration amount. Therefore, the controller 3100 performs preprocessing on the sequential data every time the predetermined period elapses, and accumulates only variables which have been preprocessed in the external transmission data accumulation unit 3105, and delete the sequential data. The variable is accumulated in the data accumulation unit 3106 of the external transmission data accumulation unit 3105. The preprocessing temporary storage unit 3101 temporarily stores the sequential data in the predetermined period, and deletes the unnecessary sequential data after the preprocessing. The color misregistration amount measurement unit 3109 actually measures the color misregistration amount based on the detection result of the pattern image by the pattern detection sensor 120, and accumulates the color misregistration amount in the color misregistration data accumulation unit 3110. The server communication unit 3108 transmits the variable accumulated in the data accumulation unit 3106 and the actually measured color misregistration data stored in the color misregistration data accumulation unit 3110 from the server communication unit 3108 to the server apparatus. These pieces of data transmitted to the server apparatus are analyzed, for example, for feeding back to the product development. These pieces of data are much larger than the data obtained in experiments in the course of the development, and the conditions at the time of data acquisition are also diverse. Therefore, collecting these pieces of data leads to the development of better products.

A color misregistration amount estimated value in the present embodiment is calculated by "FORMULA 1" shown in FIG. 10. In order to calculate the estimated value of the color misregistration amount in the predetermined period, the variable in the predetermined period is required. In the present embodiment, one object is to calculate the estimated value color misregistration amount at the time of performing actually measuring the color misregistration. Thus, in order to determine the final estimated value of the color misregistration amount, only the estimated value of the color misregistration amount for each predetermined period (each time the color misregistration is actually measured) is required. Due to the relationship between the left side and the right side of the equation illustrated in "FORMULA 3" in FIG. 10, 1) a cumulative result of the estimated value of the color misregistration amount for each predetermined period and 2) a result obtained by adding the variables for each predetermined period to obtain a cumulative result and then multiplying the cumulative result by a predetermined coefficient are found to be equivalent. Therefore, the final estimated value of the color misregistration amount can be calculated if there is a cumulative result of the variables. Therefore, as compared to the conventional method of sequentially accumulating all data and then transmitting the data to the outside, in the present embodiment, the cumulative result of variables for each predetermined period is transmitted to the external apparatus, and it is possible to reduce the data size and the communication traffic.

However, the image forming apparatus 100 after shipping is not always operating normally. Therefore, there may be a case in which the obtained data is in a range where a color misregistration prediction formula cannot be applied. In the present embodiment, the adaptability determination is performed for the color misregistration prediction formula ("FORMULA 1" in FIG. 10) by the adaptability determination unit 3103. The result of the adaptability determination is notified from the adaptability determination unit 3103 to the inadaptable determination counter 3104. The inadaptable determination counter 3104 cumulatively counts the number of times of the inadaptability determination. The inadaptable determination counter 3104 accumulates cumulative values of the number of times of the inadaptable determination (inadaptable determination count value) in the inadaptable data accumulation unit 3107 of the external transmission data accumulation unit 3105. At this time, variables which are determined to be inadaptable are also stored in the inadaptable data accumulation unit 3107 of the external transmission data accumulation unit 3105. In addition, the variable which is not determined to be inadaptable is accumulated in the data accumulation unit 3106 of the external transmission data accumulation unit 3105.

The adaptability determination unit 3103 determines whether the sequential data (temperature in the optical scanning apparatus 103 and an ambient temperature of a peripheral of the developer 105) is within a range adaptable to the estimation of the color misregistration. The adaptability determination unit 3103 determines, for example, when the change amount of at least one of the temperature inside the optical scanning apparatus 103 and the ambient temperature of the peripheral of the developer 105 is more than or equal to the upper limit value, or less than or equal to the lower limit value, that the sequential data is out of the adaptable range. The sequential data does not change abruptly because of the temperature, and the amount of change in the range that can be practically used can be set as the upper and lower limit values. In addition, it is possible to perform adaptable/inadaptable determination based on information which is different from the sequential data such as the elapsed time information of the predetermined period and the environmental temperature of a location in which the apparatus is arranged.

In a case where the result of the adaptability determination unit 3103 is inadaptable, the inadaptable determination counter 3104 cumulatively counts the number of the inadaptability determination. The inadaptable determination counter 3104 accumulates cumulative values of the number of times of the inadaptable determination (inadaptable determination count value) in the inadaptable data accumulation unit 3107 of the external transmission data accumulation unit 3105. At this time, variables of the sequential data which is determined to be inadaptable are also stored in the inadaptable data accumulation unit 3107 of the external transmission data accumulation unit 3105.

At an external transmission timing, the server communication unit 3108 transmits the inadaptable determination count value accumulated in the inadaptable data accumulation unit 3107 and the variables of the sequential data which is determined to be inadaptable to the external server apparatus. Further, the variables which are in the adaptable range and accumulated in the data accumulation unit 3106 are also transmitted to the server apparatus. When the image forming apparatus 100 is not connected to the network, the data in the external transmission data accumulation unit 3105 may be sent to the server apparatus via a portable recording medium or the like.

The controller 1100, the controller 2100, and a controller 3100 may be realized by the same CPU, or realized by different CPUs. For example, the controller 1100 may be realized by a control board which controls the operation of the developer 105, the controller 2100 may be realized by a control board which controls the operation of the photosensitive drum 101, or the controller 3100 may be realized by a control board which performs the color misregistration correction. Further, in one image forming apparatus 100, a function for realizing all three estimation processing (i.e., the estimation of the toner remaining amount, the life estimation of the photosensitive drum, and the estimation of the color misregistration amount) may be achieved. However, it is not necessary to achieve all three estimation processing.

As described in the above, in the image forming apparatus 100 of the present embodiment, it possible to achieve state prediction of parts or unit used for the formation of an image (i.e., the estimation of the toner remaining amount, the life estimation of the photosensitive drum, and the estimation of the color misregistration amount) while reducing the processing load caused by big data and preventing the reduction of information.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-192043, filed Oct. 21, 2019, which is hereby incorporated by reference herein in its entirety.

What is claimed is:

1. An image forming apparatus comprising:
   an imager former configured to form an image;
   a sensor provided in the image former;
   a memory;
   an interface configured to transmit information stored in the memory; and
   a controller configured to:
      generate, based on first data which represents detection results detected by the sensor at a plurality of timings, second data, the second data having a data size smaller than that of the first data;
      count the number of detection results, included in the first data, outside a predetermined range; and
      store the number counted and the second data in the memory as the information.

2. The image forming apparatus according to claim 1,
   wherein the image former includes a photosensitive member, a light source configured to expose the photosensitive member to form an electrostatic latent image, and a developer configured to develop the electrostatic latent image by using toner, and
   wherein the sensor includes an inductance sensor provided on the developer.

3. The image forming apparatus according to claim 2,
   wherein the first data includes density information concerning toner density in the developer; and
   wherein the controller is configured to generate the second data based on an accumulation of differences between the density information and reference density information.

4. The image forming apparatus according to claim 1,
   wherein the image former includes a photosensitive member, a light source configured to expose the photosensitive member to form an electrostatic latent image, and a developer configured to develop the electrostatic latent image by using toner replenished from a toner container mounted on a mounting portion,
   wherein the toner is supplied to the developer by rotating the toner container, and
   wherein the sensor detects a rotation of the toner container.

5. The image forming apparatus according to claim 1,
   wherein the image former includes a photosensitive member, a light source configured to expose the photosensitive member to form an electrostatic latent image, and a developer configured to develop the electrostatic latent image by using toner, and
   wherein the sensor includes a temperature sensor.

6. The image forming apparatus according to claim 1,
   wherein the image former includes a photosensitive member, a light source configured to expose the photosensitive member to form an electrostatic latent image, and a developer configured to develop the electrostatic latent image by using toner, and
   wherein the sensor detects humidity.

7. The image forming apparatus according to claim 6,
wherein the controller is configured to calculate an average of the humidity to generate the second data based on an accumulation of the averages.

8. The image forming apparatus according to claim 1,
wherein the image former includes a photosensitive member, a light source configured to expose the photosensitive member to form an electrostatic latent image, and a developer configured to develop the electrostatic latent image by using toner, and
wherein the sensor detects a detection image formed by the image former.

9. The image forming apparatus according to claim 8,
wherein the controller is configured to calculate an average of the detection results of the detection image to generate the second data based on an accumulation of the averages.

10. The image forming apparatus according to claim 1,
wherein the controller is configured to calculate a change of the detection results of the sensor to generate the second data based on an accumulation of the changes.

11. The image forming apparatus according to claim 1,
wherein the controller is configured to calculate an average of the detection results of the sensor to generate the second data based on an accumulation of the averages.

12. An image forming apparatus comprising:
an image former configured to form an image;
a rotating member provided in the image former;
a memory;
an interface configured to transmit information stored in the memory; and
a controller configured to:
  obtain a drive time of the rotating member to rotate;
  generate, based on first data which represents the drive times obtained at a plurality of timings, second data, the second data having a data size smaller than that of the first data,
  count the number of drive times, included in the first data, outside a predetermined range; and
  store the number counted and the second data in the memory as the information.

13. The image forming apparatus according to claim 12,
wherein the image former includes a photosensitive member, a light source configured to expose the photosensitive member to form an electrostatic latent image, and a developer configured to develop the electrostatic latent image by using toner replenished from a toner container mounted on a mounting portion,
wherein the toner is supplied to the developer by rotating the toner container, and
wherein the rotating member includes the toner container mounted on the mounting portion.

14. The image forming apparatus according to claim 12,
wherein the image former includes a photosensitive member, a light source configured to expose the photosensitive member to form an electrostatic latent image, and a developer configured to develop the electrostatic latent image by using toner, and
wherein the rotating member includes a motor for rotating the photosensitive member.

15. The image forming apparatus according to claim 12,
wherein the image former includes a photosensitive member, a charger configured to charge the photosensitive member, a light source configured to expose the photosensitive member charged by the charger to form an electrostatic latent image, and a developer configured to develop the electrostatic latent image by using toner, and
wherein the rotating member includes a motor for rotating the charger.

16. An image forming apparatus comprising:
a sensor provided in the image forming apparatus; and
a controller configured to:
  obtain a detection result of the sensor;
  generate, based on first data representing to detection results of the sensor obtained at a plurality of timings, second data, the second data having a data size smaller than that of the first data;
  determine an error detection result included in the first data; and
  transmit the second data and a determination result of the error.

* * * * *